US012769437B2

(12) United States Patent
Paul

(10) Patent No.: US 12,769,437 B2
(45) Date of Patent: Oct. 20, 2026

(54) USER INTERFACES FOR DISPLAYING, TRANSMITTING, AND RECEIVING COMMUNICATIONS

(71) Applicant: Apple Inc., Cupertino, CA (US)

(72) Inventor: Grant R. Paul, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 18/658,850

(22) Filed: May 8, 2024

(65) Prior Publication Data

US 2025/0004617 A1 Jan. 2, 2025

Related U.S. Application Data

(60) Provisional application No. 63/500,975, filed on May 9, 2023.

(51) Int. Cl.
*G06F 3/0484* (2022.01)
*H04L 51/212* (2022.01)

(52) U.S. Cl.
CPC .......... *G06F 3/0484* (2013.01); *H04L 51/212* (2022.05)

(58) Field of Classification Search
CPC .................................................... G06F 3/0484
USPC ........................................................ 715/752
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |

(Continued)

FOREIGN PATENT DOCUMENTS

| | | |
|---|---|---|
| WO | 2013169849 A2 | 11/2013 |
| WO | 2014105276 A1 | 7/2014 |

OTHER PUBLICATIONS

Djamina et al. "Strategies for using Whatsapp to Deliver Teaching at a distance", published in Oct. 2020 (Year: 2020).*

(Continued)

*Primary Examiner* — Reza Nabi
(74) *Attorney, Agent, or Firm* — Kubota & Basol LLP

(57) ABSTRACT

Some embodiments described in this disclosure are directed to one or more electronic devices that display a plurality of user interfaces corresponding to messaging in hybrid group messaging conversations. Some embodiments described in this disclosure are directed to adding a user to a hybrid group messaging conversation. Some embodiments described in this disclosure are directed towards deleting a hybrid group messaging conversation.

24 Claims, 33 Drawing Sheets

(56) References Cited

U.S. PATENT DOCUMENTS

| | | | | |
|---|---|---|---|---|
| 10,484,321 | B2 * | 11/2019 | Weksler | H04L 51/212 |
| 10,587,551 | B1 * | 3/2020 | Acton | H04L 51/046 |
| 10,826,860 | B2 * | 11/2020 | Tian | H04L 51/04 |
| 11,546,279 | B1 * | 1/2023 | Karimli | H04W 4/14 |
| 11,693,553 | B2 * | 7/2023 | Weskamp | G06F 9/544 715/752 |
| 11,729,216 | B1 * | 8/2023 | Roques | H04L 51/066 709/223 |
| 12,093,521 | B2 * | 9/2024 | Weskamp | G06F 9/541 |
| 2002/0015024 | A1 | 2/2002 | Westerman et al. | |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2006/0197753 | A1 | 9/2006 | Hotelling | |
| 2014/0006525 | A1 | 1/2014 | Freund et al. | |
| 2014/0282016 | A1 * | 9/2014 | Hosier, Jr. | H04W 4/08 715/733 |
| 2015/0012846 | A1 * | 1/2015 | Xie | G06Q 10/10 715/753 |
| 2015/0121202 | A1 * | 4/2015 | Saund | H04L 51/10 715/249 |
| 2017/0118622 | A1 * | 4/2017 | Jiang | H04W 8/12 |
| 2018/0198831 | A1 * | 7/2018 | Calcaterra | H04L 43/20 |
| 2018/0351903 | A1 * | 12/2018 | Allen | G06Q 10/10 |
| 2019/0171338 | A1 * | 6/2019 | Voss | H04L 51/046 |
| 2020/0274841 | A1 * | 8/2020 | Lee | G06F 3/0486 |
| 2021/0029249 | A1 * | 1/2021 | Erhart | H04L 51/02 |
| 2021/0342038 | A1 * | 11/2021 | Leon | G06F 16/90335 |
| 2021/0342785 | A1 * | 11/2021 | Mann | G06F 40/18 |
| 2022/0046752 | A1 * | 2/2022 | Lee | H04W 76/40 |
| 2022/0278863 | A1 * | 9/2022 | Huang | H04L 12/1813 |
| 2022/0384061 | A1 * | 12/2022 | Nandwana | H04W 4/14 |
| 2023/0048945 | A1 * | 2/2023 | Sodagar | H04L 65/65 |
| 2024/0257022 | A1 * | 8/2024 | Jayaraman | G06Q 10/06393 |
| 2024/0406291 | A1 * | 12/2024 | Lottermoser | H04L 69/18 |
| 2025/0004617 | A1 * | 1/2025 | Paul | G06F 3/04883 |
| 2025/0038973 | A1 * | 1/2025 | Rodriguez Bravo | H04L 63/101 |
| 2026/0052359 | A1 * | 2/2026 | Ogandzhanyants | G06Q 10/10 |

OTHER PUBLICATIONS

International Search Report received for PCT Patent Application No. PCT/US2024/028434, mailed on Oct. 28, 2024, 6 pages.

* cited by examiner

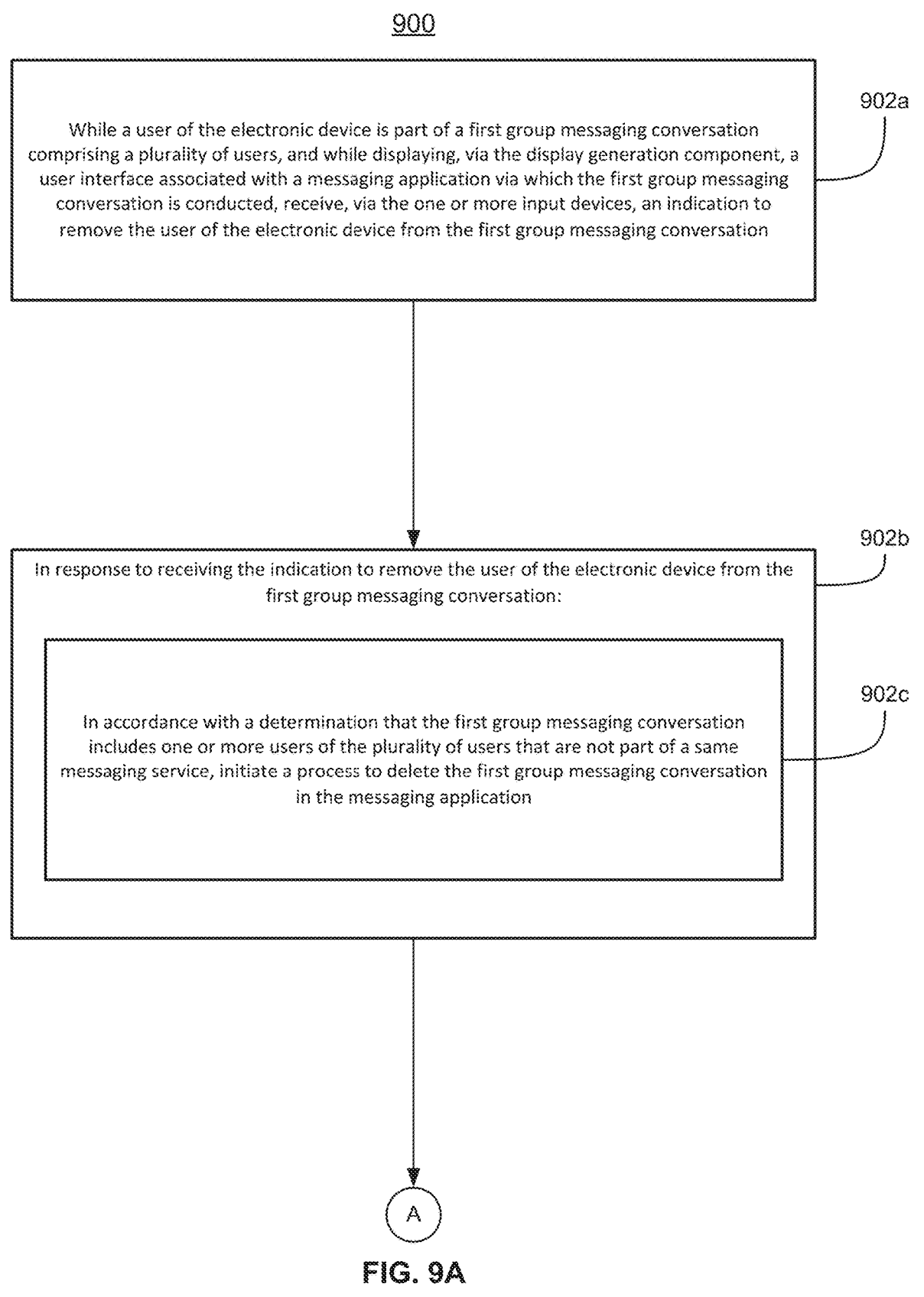

900

902a: While a user of the electronic device is part of a first group messaging conversation comprising a plurality of users, and while displaying, via the display generation component, a user interface associated with a messaging application via which the first group messaging conversation is conducted, receive, via the one or more input devices, an indication to remove the user of the electronic device from the first group messaging conversation 902b: In response to receiving the indication to remove the user of the electronic device from the first group messaging conversation:

902c: In accordance with a determination that the first group messaging conversation includes one or more users of the plurality of users that are not part of a same messaging service, initiate a process to delete the first group messaging conversation in the messaging application

A

FIG. 9A

USER INTERFACES FOR DISPLAYING, TRANSMITTING, AND RECEIVING COMMUNICATIONS

CROSS-REFERENCE TO RELATED APPLICATIONS

This application claims the benefit of U.S. Provisional Application No. 63/500,975, filed May 9, 2023, the entire disclosure of which is herein incorporated by reference for all purposes.

FIELD OF THE DISCLOSURE

This disclosure relates generally to user interfaces associated with displaying, transmitting, and receiving communications with an electronic device.

BACKGROUND OF THE DISCLOSURE

User interaction with electronic devices has increased significantly in recent years. These devices can be devices such as computers, tablet computers, televisions, multimedia devices, or mobile devices. In some circumstances, users may wish to use such devices to send and/or receive communications. Enhancing the user's interactions with the device improves the user's experience with the device and decreases user interaction time, which is particularly important where input devices are battery-operated.

SUMMARY OF THE DISCLOSURE

Some embodiments described in this disclosure are directed to one or more electronic devices that display a plurality of user interfaces corresponding to messaging in hybrid group messaging conversations. Some embodiments described in this disclosure are directed to adding a user to a hybrid group messaging conversation. Some embodiments described in this disclosure are directed towards deleting a hybrid group messaging conversation. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 9A-9C is a flow diagram illustrating a method in which an electronic device deletes a hybrid group messaging conversation in accordance with some embodiments of the disclosure.

DETAILED DESCRIPTION

Figure 1A:
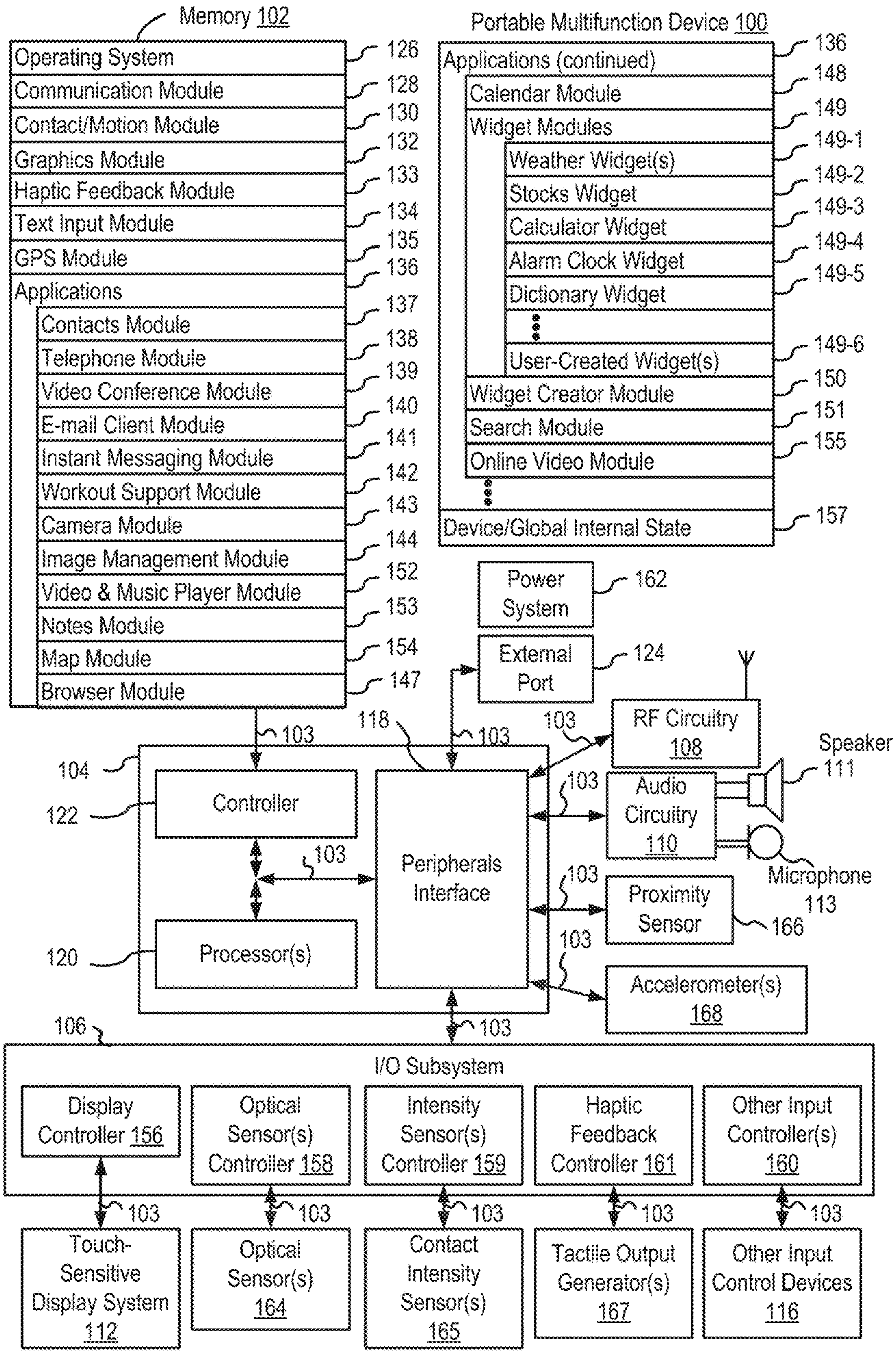
FIG. 1A is a block diagram illustrating a portable multifunction device with a touch-sensitive display in accordance with some embodiments.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for electronic devices to communicate with and receive communications from devices that use different messaging services. There is also a need for electronic devices to facilitate adding and removing users to a group messaging conversation when the group messaging conversation includes members who use different messaging services (e.g., a hybrid group messaging conversation). In some embodiments, an electronic device initiates a process to generate a new group messaging conversation, when the user of the electronic device attempts to add a user to a hybrid group messaging conversation. Such techniques allow users to modify membership of a hybrid group messaging conversation, without the need for manual user input to create such group messaging conversations.

There is a need for electronic device to facilitate deleting and blocking hybrid group messaging conversations. In some embodiments, an electronic device initiates a process to delete a hybrid group messaging conversation in a messaging application. Such techniques allows the user to remove themselves from undesired group messaging activity, thereby reducing resource consumption by the electronic device and reducing the manual user input needed to delete hybrid group messaging conversations.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
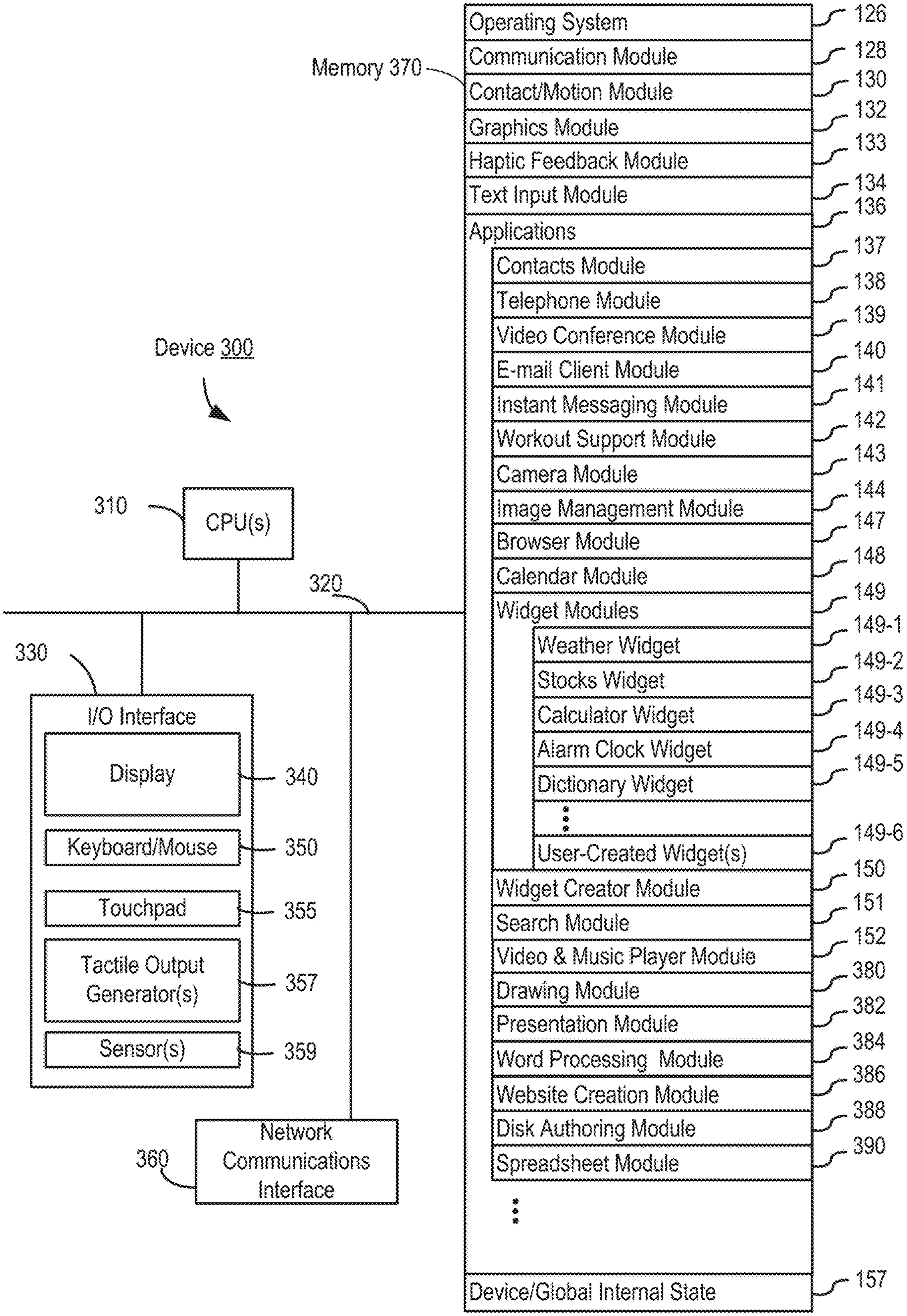
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
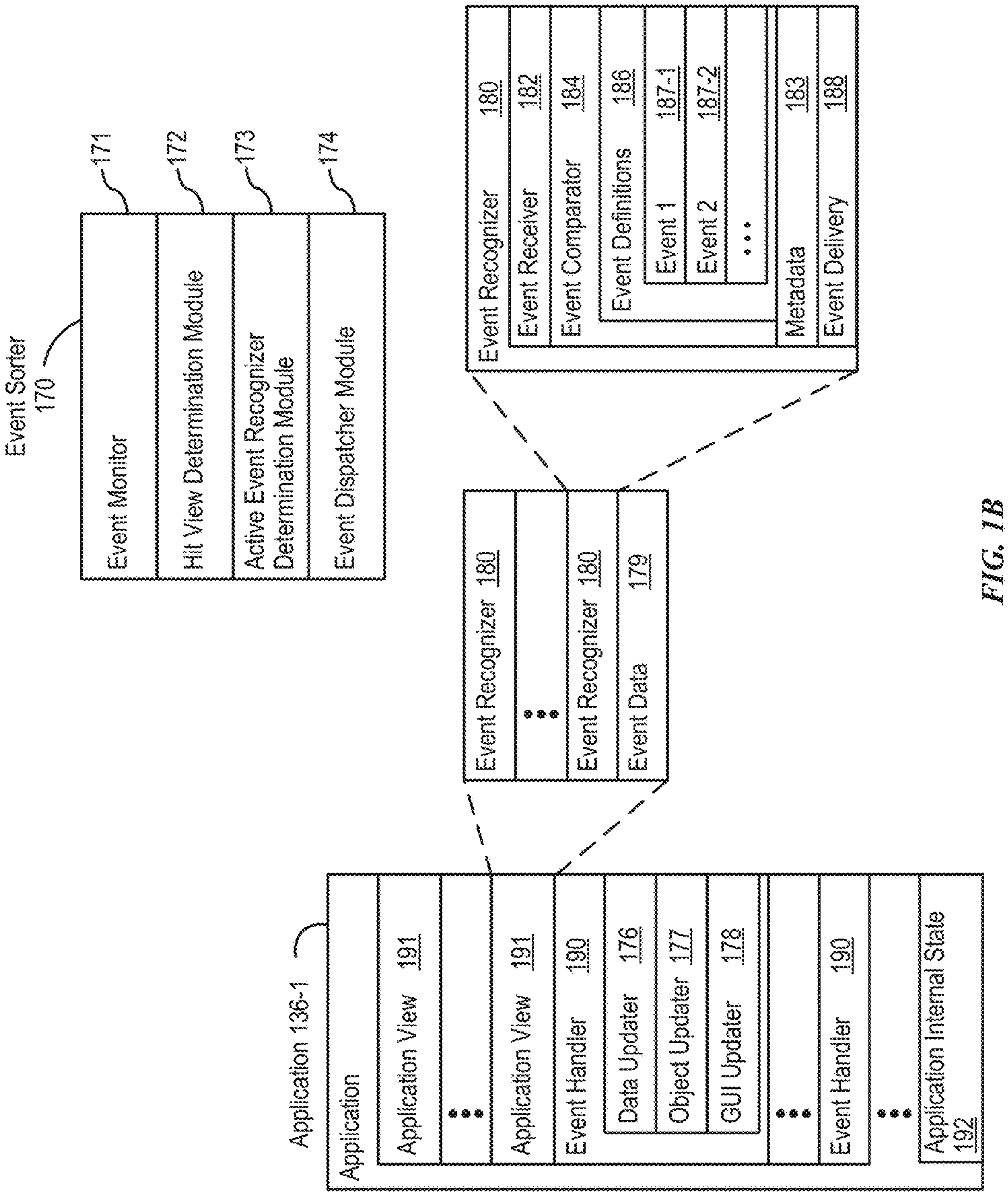
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
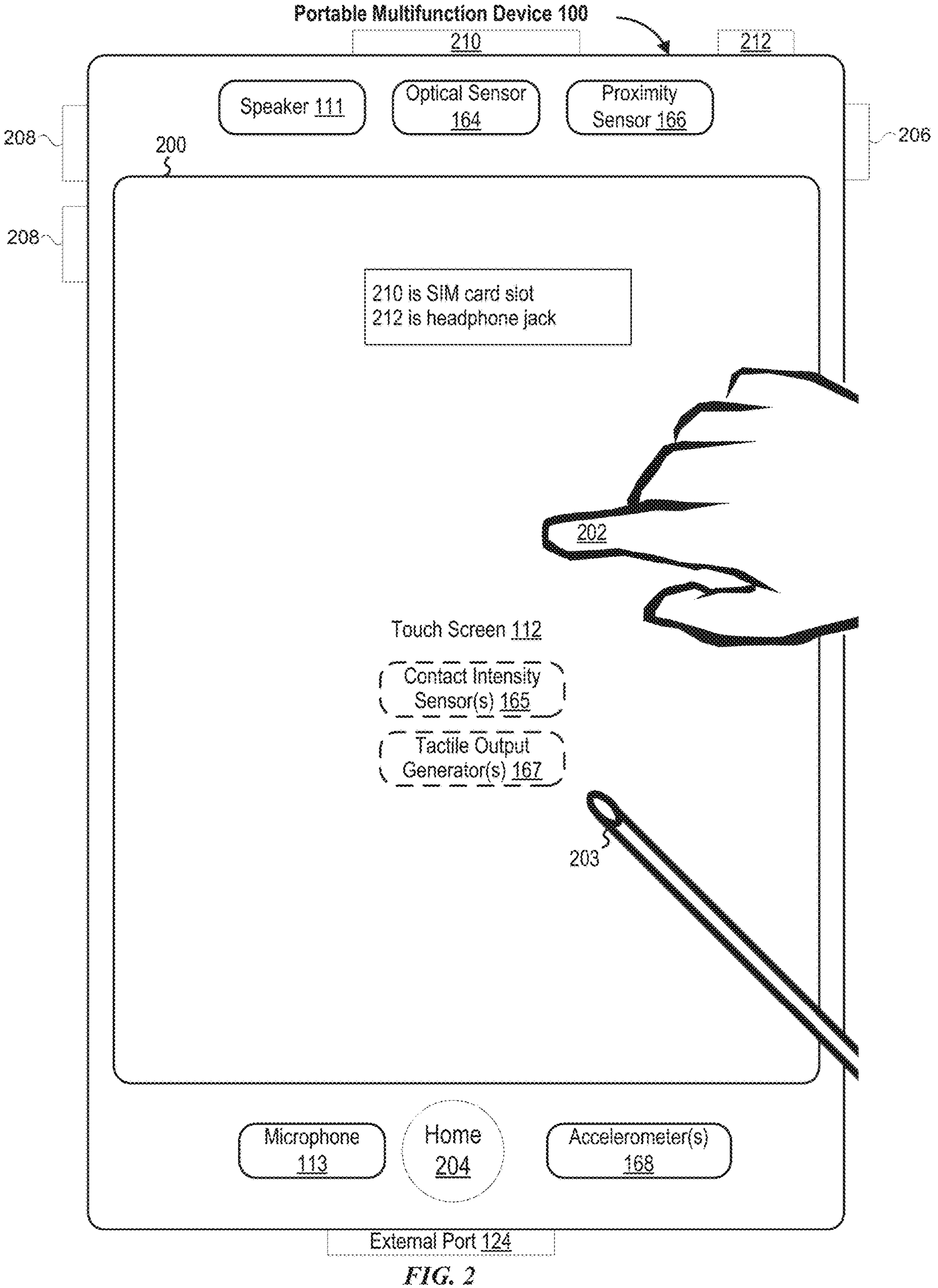
FIG. 2 illustrates a portable multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
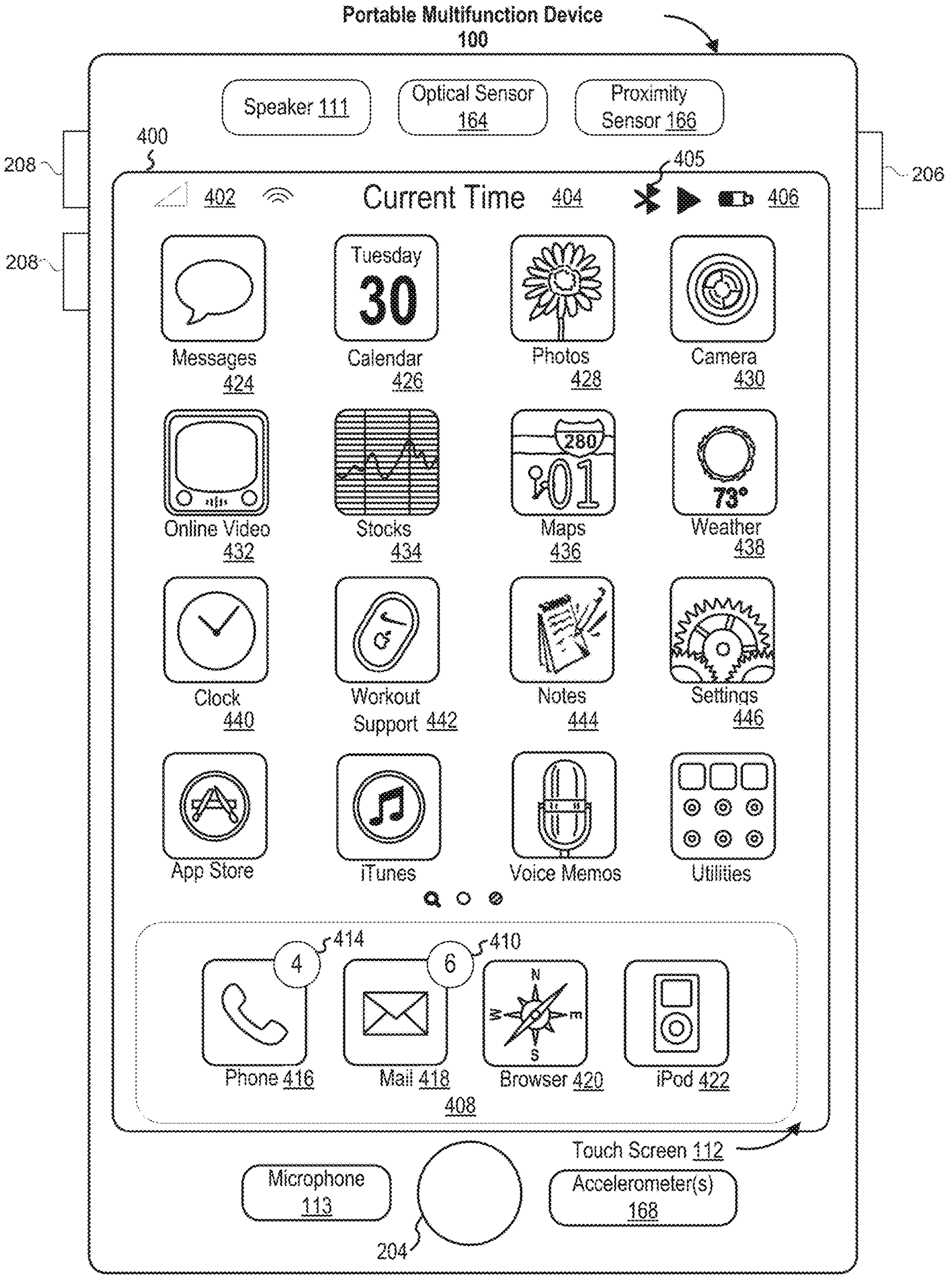
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
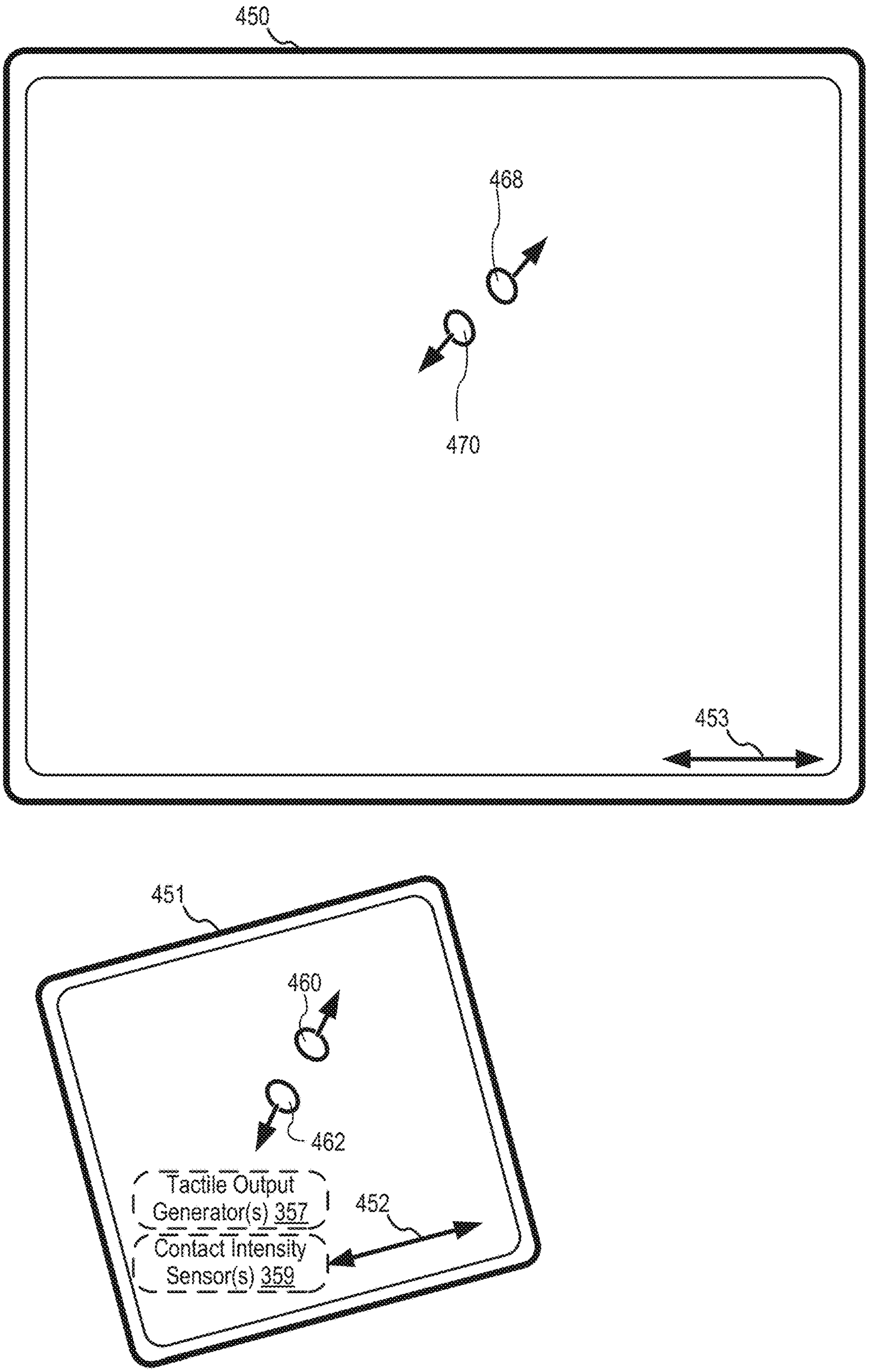
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
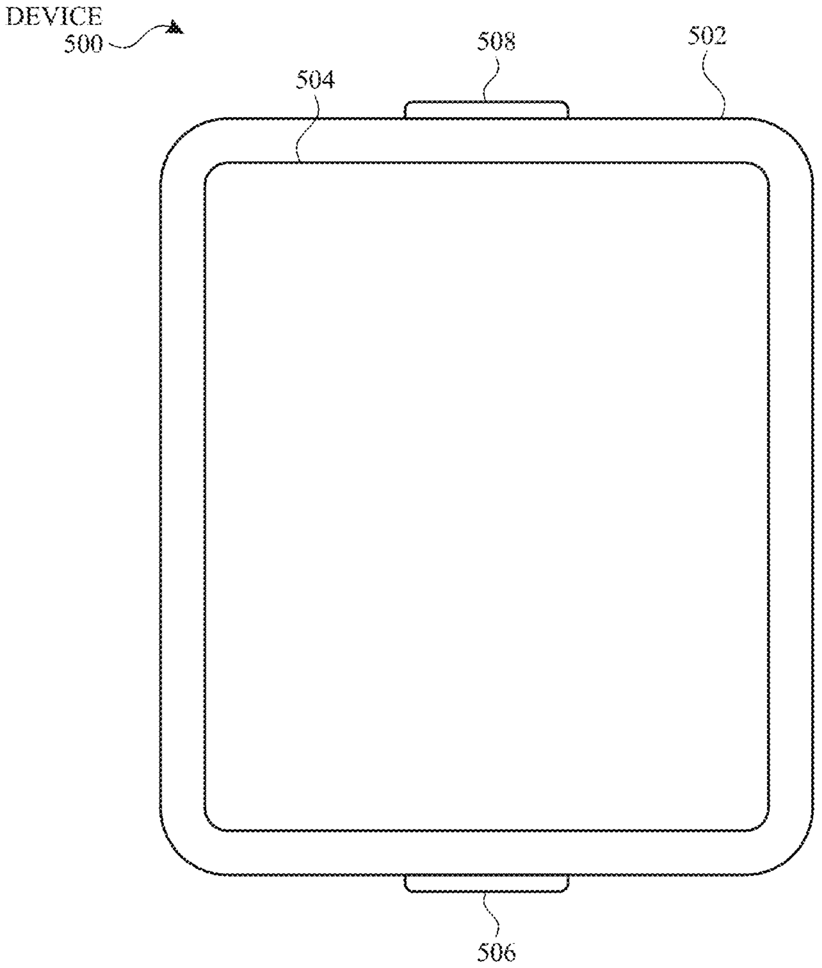
FIG. 5A illustrates a personal electronic device in accordance with some embodiments.
Figure 5B:
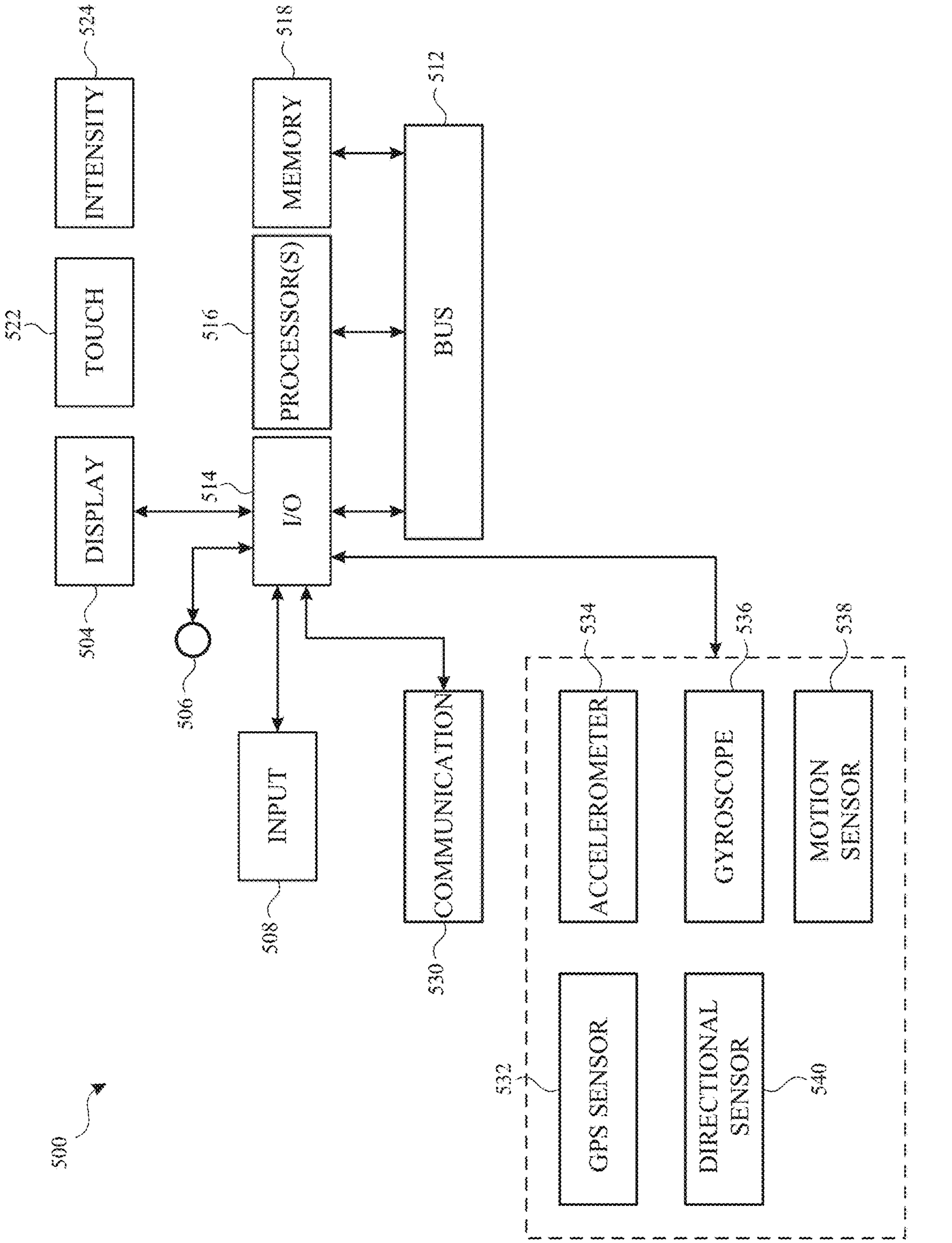
FIG. 5B is a block diagram illustrating a personal electronic device in accordance with some embodiments.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700 and/or 900). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIGS. 5, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
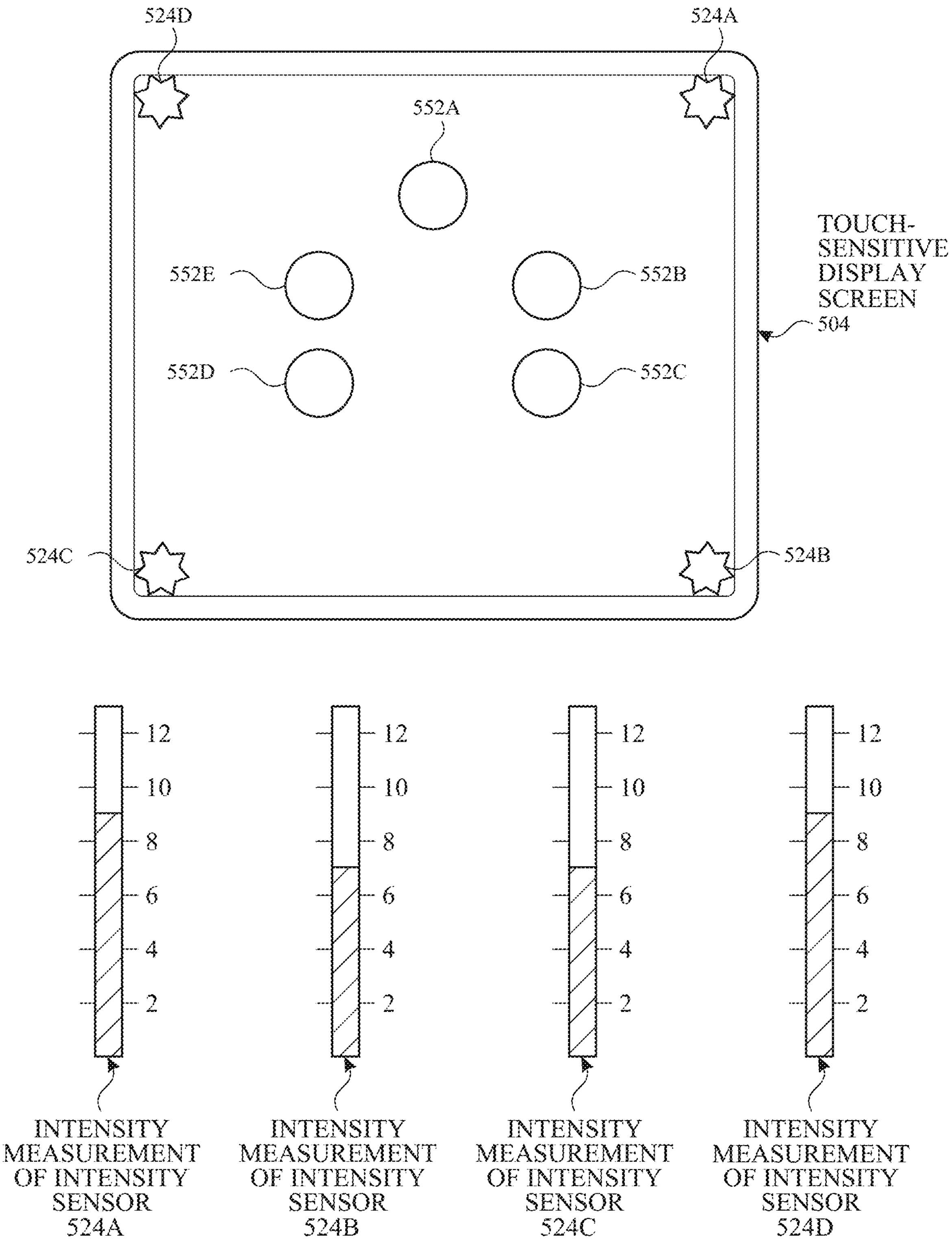
FIGS. 5C-5D illustrate exemplary components of a personal electronic device having a touch-sensitive display and intensity sensors in accordance with some embodiments.
Figure 5D:
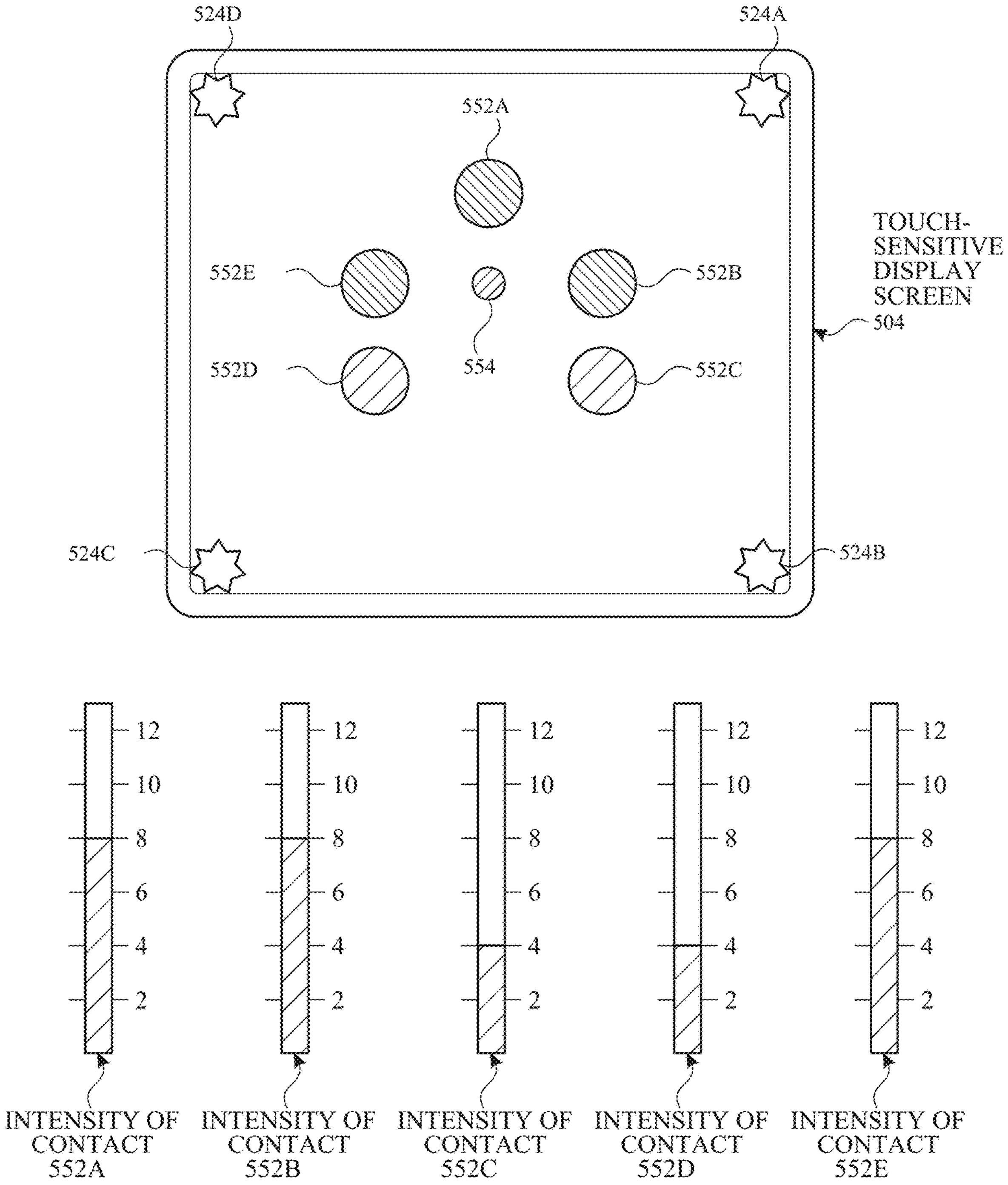

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A (Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
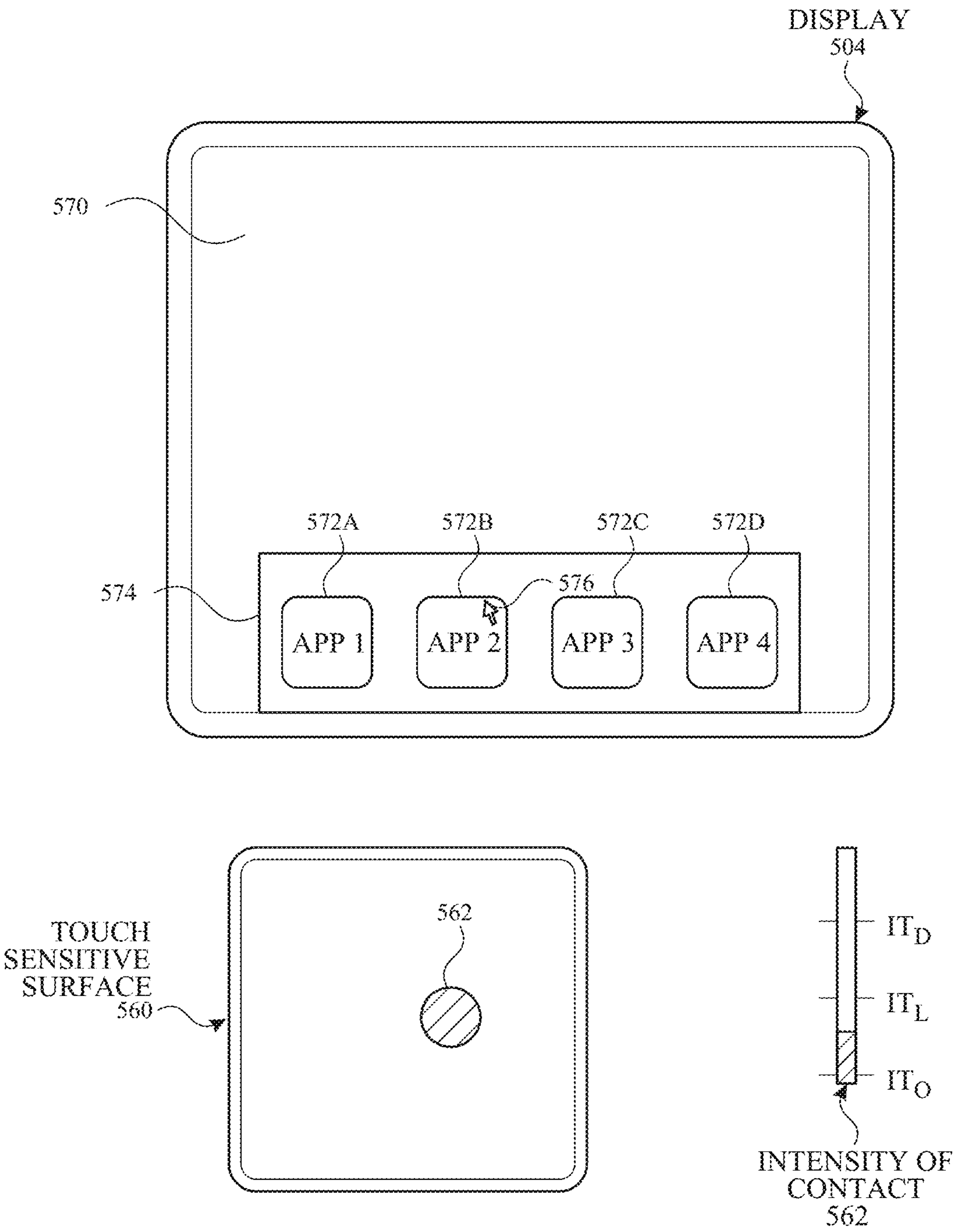
FIGS. 5E-5H illustrate exemplary components and user interfaces of a personal electronic device in accordance with some embodiments.
Figure 5F:
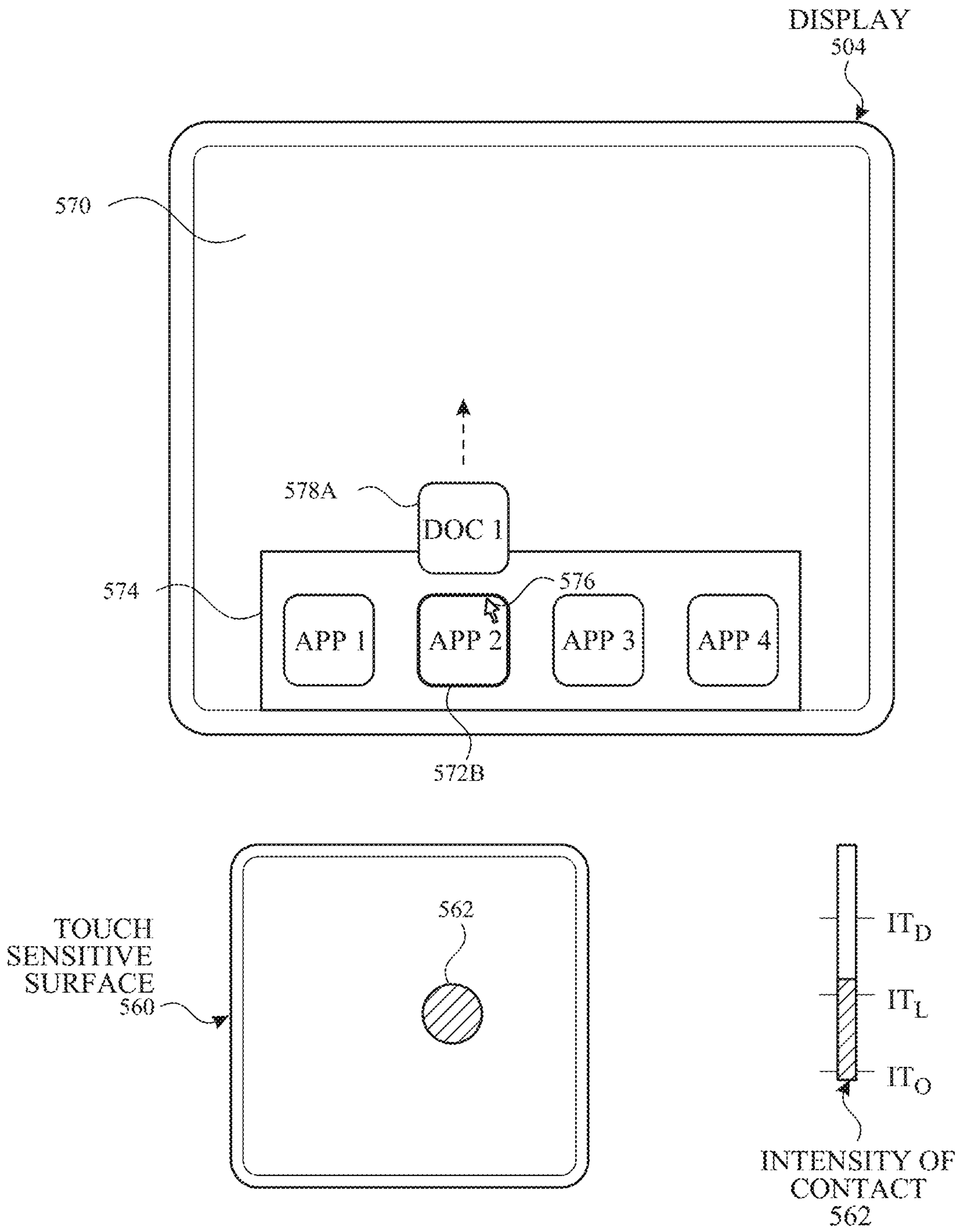
Figure 5G:
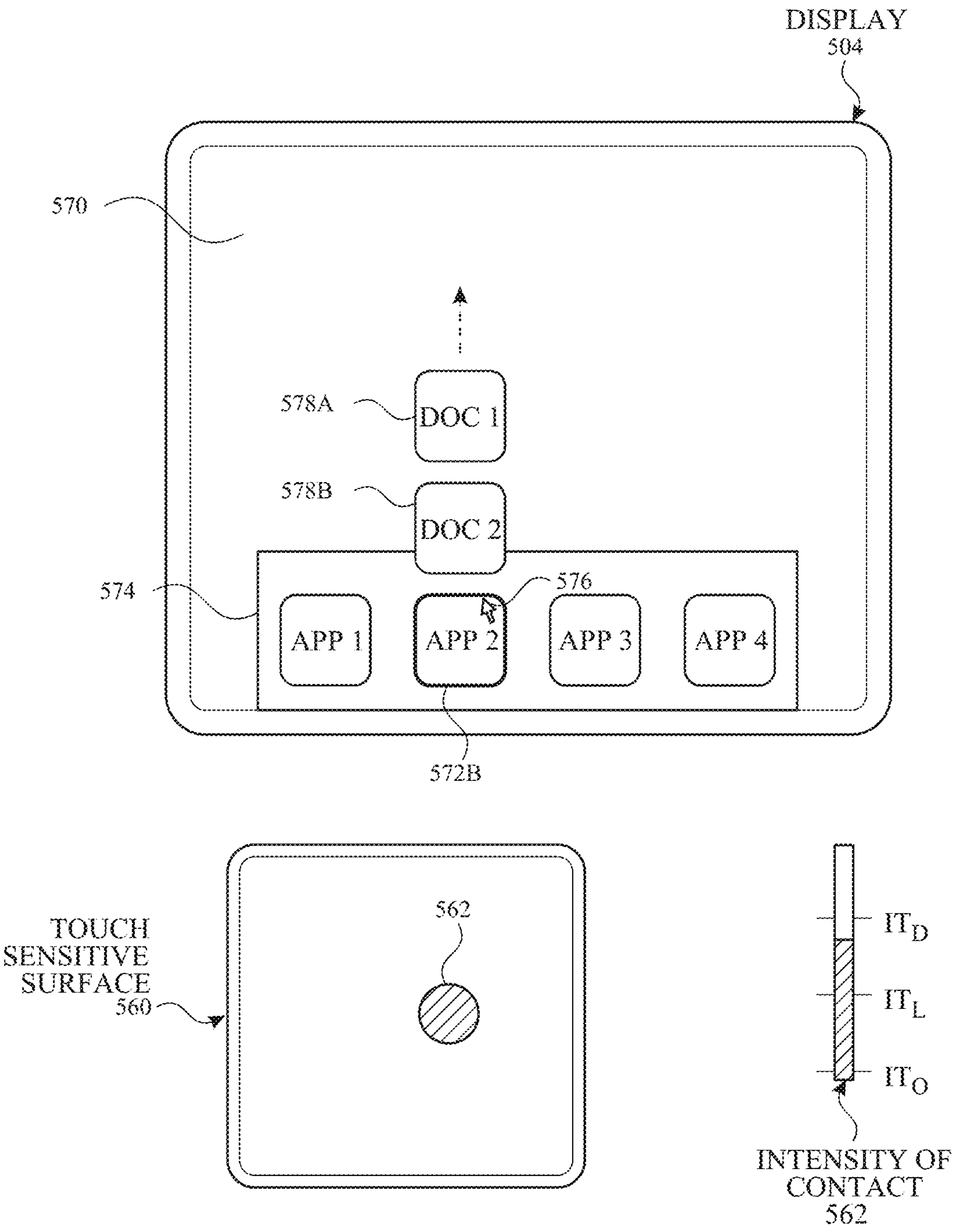
Figure 5H:
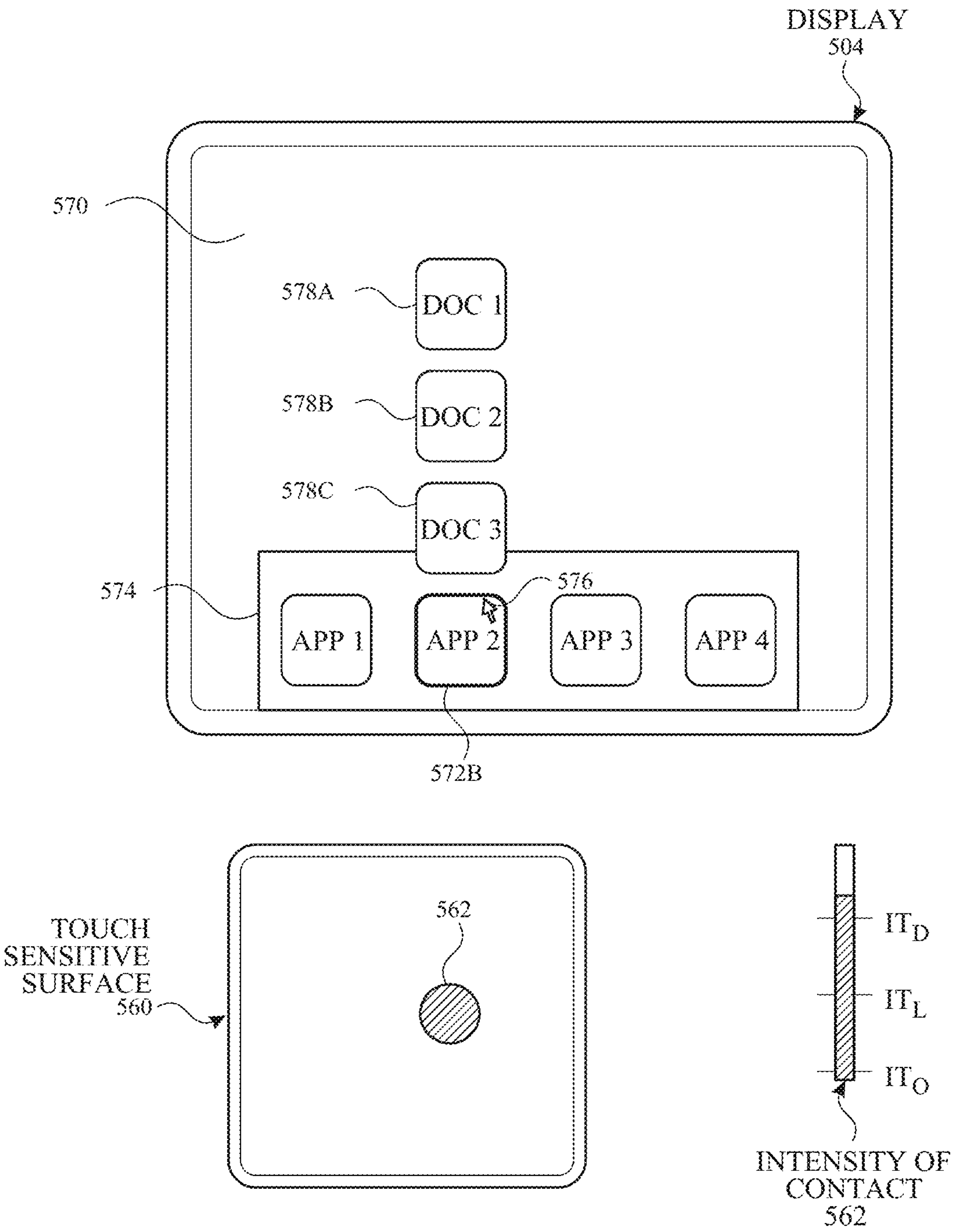

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as device 100, device 300, or device 500.

User Interfaces and Associated Processes

User Interfaces for Sending and/or Receiving Messages

Users interact with electronic devices in many different manners, including interacting with messaging applications for sending and receiving electronic messages to other people or groups of people. In some embodiments, an electronic device displays a messaging conversation in a messaging application, where the messaging conversation includes messages sent from the user of the electronic device as well as messages sent to the user of the device from other people. In some circumstances, the messages transmitted from and received by the messaging application includes text messages, images, web links, and other data. The messaging application facilitates the exchange of messages between the user of the electronic device and other external users. In some circumstances, the messaging application facilitates a group messaging conversation. A group messaging conversation allows for a plurality of users that belong to the group messaging conversation to share messages with one another such that messaging activity occurring on the group messaging conversation will be seen by other or all of the plurality of users who are members/users of the group messaging conversation. In some circumstances, all users that are part of a group messaging conversation utilize the same messaging service, thus allowing the membership of the group messaging conversation (e.g., the users who are part of the group messaging conversation) to be adjusted by adding and removing users to the group messaging conversation. In some circumstances however, the members of a group messaging conversation may not be using the same messaging service, thereby making it more difficult to add or remove users to the group messaging conversation. In some circumstances where a group messaging conversation is a "hybrid" group messaging conversation (e.g., the users of the group messaging service are not all using the same messaging service), it is not possible to add a user to a group messaging conversation without creating an entirely new group messaging conversation from scratch that includes the user to be added. In some circumstances, anytime a user wants to add another user to a hybrid group messaging conversation, they have to repeat the process of creating a new group messaging conversation from scratch to add the additional user. Requiring the user to engage in a process to create a new group messaging conversation from scratch each time the user wants to add or remove a user from a group messaging conversation can lead to erroneous inputs on the device, and consume computing resources on the device. The embodiments described below provide ways in which an electronic device provides efficient user interfaces for adding users to, and removing a user from, a hybrid group messaging conversation, thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6K illustrate exemplary ways in which an electronic device displays user interfaces for adding a user to a hybrid group messaging conversation. The embodiments in these figures are used to illustrate the processes described below, including the processes described with reference to FIG. 7. Although FIGS. 6A-6K illustrate various examples of ways an electronic device is able to perform the processes described below with respect to FIG. 7, it should be understood that these examples are not meant to be limiting, and the electronic device is able to perform one or more processes described below with reference to FIG. 7 in ways not expressly described with reference to FIGS. 6A-6K.

Figure 6A:
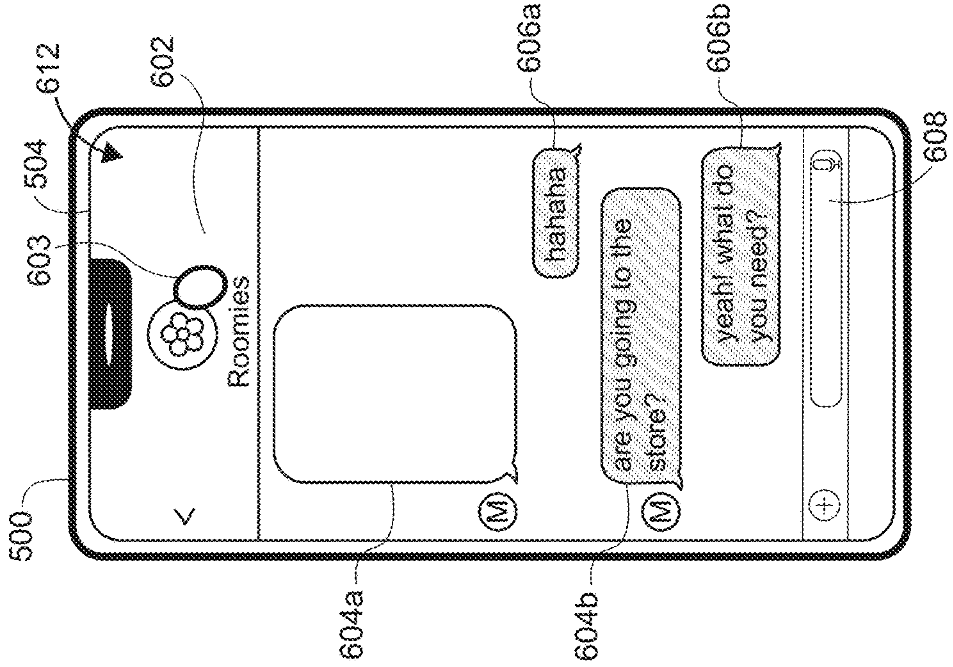
FIGS. 6A-6K illustrate examples of an electronic device adding one or more users to a hybrid group messaging conversation in accordance with some embodiments of the disclosure.

FIG. 6A illustrates an exemplary device 500 displaying a user interface 612. In some embodiments, the user interface 612 is displayed via a display generation component. In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device.

In some embodiments, an electronic device (e.g., device 500) includes a messaging application. The messaging application can represent messaging activity sent from other electronic devices (by users of those respective devices) and messaging activity originating at the electronic device (sent by the user of the electronic device). In some embodiments, messaging activity transmitted and received by the messaging application includes, but is not limited to, text messages, images, photos, web-based links, and other media. In some embodiments, the messaging application facilitates group messaging conversations. A group messaging conversation can refer to a conversation (e.g., a plurality of messaging activity) that is shared amongst a plurality of users (including the user of the electronic device) such that messaging activity transmitted to the group messaging conversation by any of the plurality of users in the group messaging conversation is displayed by the electronic device on the user interface of the messaging application used to conduct the group messaging conversation. In some embodiments, a group messaging conversation is conducted as a "non-hybrid" group messaging conversation. A "non-hybrid" group messaging conversation conducted on the messaging application can refer to a group messaging conversation in which all the users of the plurality of users that are part of a group messaging use the same messaging service to conduct the group messaging conversation. As an example, a group messaging conversation in which all of the plurality of users use the IMESSAGE messaging service would be considered a non-hybrid group messaging conversation. In some embodiments, a "hybrid" group messaging application conducted on the messaging application can refer to a group messaging conversation in which one or more users use a first messaging service (such as IMESSAGE) while one or more users of the group messaging conversation use a second messaging service that is different from the first messaging service. As an example, one or more of the users of the group messaging service use the IMESSAGE messaging service, while one or more users of the group messaging service use the Short Message Service ("SMS") messaging service. In some embodiments, the messaging application can display both hybrid and non-hybrid group messaging conversations. In some embodiments (and as discussed in further detail below), the messaging application conducts certain operations associated with a group messaging conversation based on whether the group messaging conversation is a hybrid group messaging conversation or a non-hybrid group messaging conversation.

As shown in FIG. 6A, the electronic device 500 displays a messaging user interface 612 (e.g., of a messaging application installed on device 500) on touch screen 504. In some embodiments, user interface 612 is any user interface that displays information about one or more messaging conversations including one or more group messaging conversations. In FIG. 6A, the messaging user interface 612 includes messaging activity pertaining to a group messaging conversation labeled as "Roomies." The user interface 612 includes a group messaging conversation information portion 602 that displays the name of the group (e.g., Roomies). Optionally, the conversation information portion 602 of user interface 612, in addition to including the name of the group messaging conversation, also includes a photo associated with the group messaging conversation.

In some embodiments, the user interface 612 of the messaging application illustrated in FIG. 6A includes messaging activity associated with the group messaging conversation. For instance, and as illustrated in FIG. 6A, the user interface 612 includes messaging activity 604A-B from a first user of the group messaging, and includes messaging activity 606A-B from the user of the electronic device on which the messaging application is running. FIG. 6A illustrates a non-hybrid group messaging conversation, in which all of the users that are part of the group messaging conversation utilize the same messaging service to interact with the group messaging conversation. Optionally, the user interface 612 includes one or more visual indicators that identify the group messaging conversation as being a non-hybrid group messaging conversation. For example, messaging activity 606A-B on user interface 612 is colored/highlighted to indicate that the Roomies group messaging conversation is a non-hybrid group messaging conversation. In some embodiments, messaging activity 604A-B includes the same color/highlighting to indicate that the Roomies group messaging conversation is a non-hybrid group messaging conversation. In some embodiments, the user interface 612 includes a messaging activity entry portion 608 (e.g., a text or content entry field) that is selectable by the user of the electronic device and receives entry of messaging activity (such as text) that is then displayed in user interface 612 as part of the group messaging conversation.

Figure 6B:
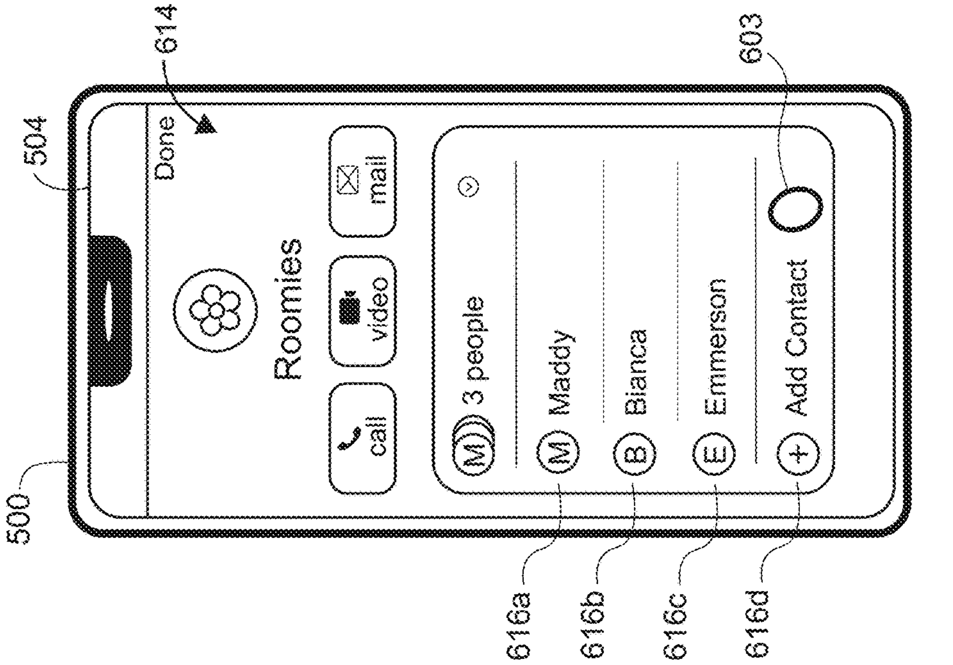

In some embodiments, group conversation information portion 602 is selectable. In FIG. 6A, device 500 detects selection of portion 602 (e.g., via a tap of contact 603 on portion 602). In response to detecting the selection of portion 602, device 500 displays a group messaging conversation information user interface 614 of the messaging application as shown in FIG. 6B. Group messaging conversation information user interface 614 includes various selectable options 616A-D to perform various operations associated with the group messaging conversation. For example, user interface 614 optionally includes selectable options 616A-C that when selected cause the device to display information about a user associated with the selectable option. For instance, when an indication is received at the device 500 (e.g., by a tap on the touchscreen) that the user has selected one of options 616A-C, the device can display a user interface that includes contact information associated with the selectable option.

Figure 6C:
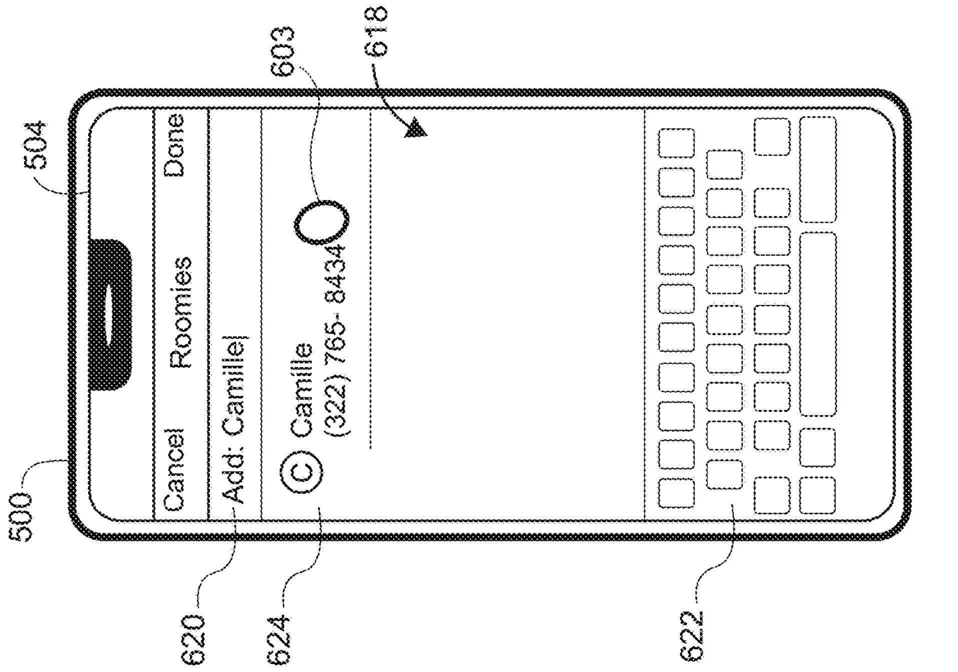

In some embodiments, the user interface 614 includes selectable option 616D to add an additional user to the group messaging conversation. In FIG. 6B, device 500 detects selection of selectable option 616D (e.g., via a tap of contact 603 on option 616D). In response to detecting the selection of option 616D to add an additional user to the group messaging conversation, the device 500 displays a group messaging conversation user addition user interface 618 as shown in FIG. 6C. User interface 618 includes a username portion 620 that is selectable, and optionally allows for the user of the electronic device to type (e.g., using a touch screen keyboard 622) the name or other identifier of the user to be added to the group messaging conversation. In some embodiments, when the device detects that the user has typed the full or partial name of the user at username portion 620, the device searches for a matching entry in a contacts list stored on the electronic device. In some embodiments, when the device has found a matching entry, the user interface 618 includes a matching entry portion 624 that displays details associated with the matching entry including the name associated with the matching entry as well as an electronic messaging identifier (such as a phone number or email) associated with the matching entry. Matching entry portion 624 is selectable. In FIG. 6C, device 500 detects the selection of portion 624 (e.g., via a tap of contact 603 on portion 624).

Figure 6D:
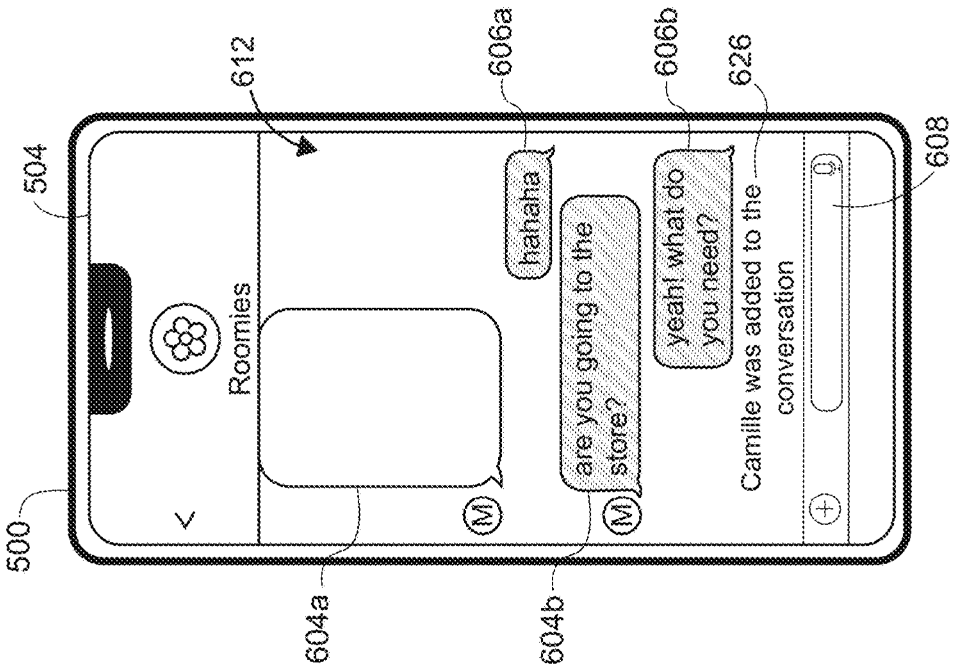

In some embodiments, and in response to detecting the selection of portion 624, device 500 determines whether the user to be added uses the same messaging service as the plurality of users who are part of the group messaging conversation, which would therefore keep the group messaging conversation as a non-hybrid group messaging conversation. In some embodiments, if the device via the messaging application determines that adding the user would maintain the group messaging conversation as a non-hybrid group messaging conversation, then the selection of portion 624 causes the device to display user interface 612 (described above with respect to FIG. 6A) as shown in FIG. 6D. Optionally, in response to having added the user, user interface 612 includes an indication portion 626 that includes a message to the user of the device indicating that the added user has been successfully added to group messaging conversation.

Figure 6F:
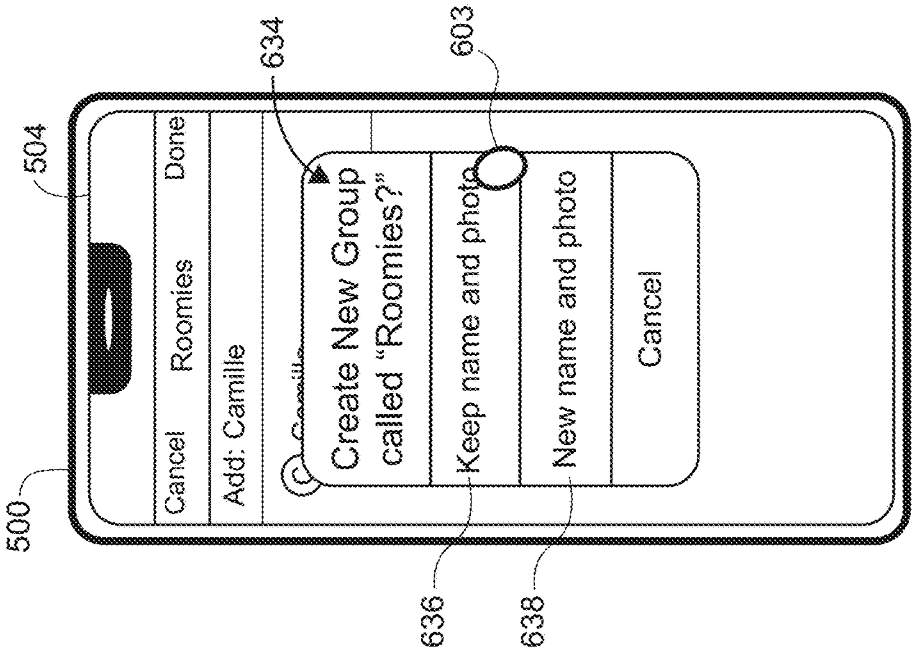
Figure 6E:
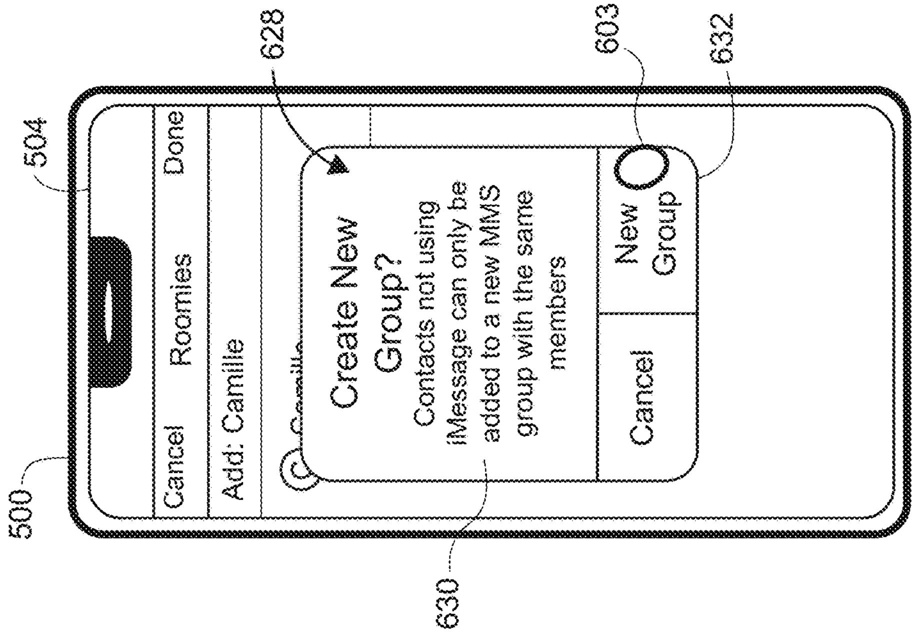

In some embodiments, if the device via the messaging application determines that adding the user would cause the group messaging conversation to become a hybrid group messaging conversation (e.g., the user to be added uses a messaging service that is different than the other users of the group messaging conversation), or if the group messaging conversation was already a hybrid group messaging conversation, then the selection of portion 624 on the user interface 618 of FIG. 6C causes the device to display new group messaging generation user interface 628 as illustrated at FIG. 6E. In some embodiments, user interface 628 includes an information portion 630 that includes a message to the user indicating that adding the user will cause the group messaging conversation to transition from a non-hybrid group messaging conversation to a hybrid group messaging conversation. In some embodiments, user interface 628 includes various selectable options including selectable option 632 that when selected by the user, initiates a process to create a new hybrid group messaging conversation that includes the plurality of users from the current group messaging conversation as well as the user to be added. In FIG. 6E, device 500 detects selection of selectable option 632 (e.g., via a tap of contact 603 on option 632). In response to detecting the selection of option 632, the device 500 displays a group messaging conversation creation user interface 634 as shown in FIG. 6F.

In some embodiments, group messaging conversation creation user interface 634 includes various selectable options that allow the user to select identifying information to associate with the new group messaging conversation. Optionally, the selectable options include option 636 that when selected by the user transfers the identifying information (e.g., the name and image) associated with the previous group messaging conversation (e.g., the group messaging conversation associated with the plurality of members prior to adding the new member) to the newly created group messaging conversation. Optionally, the selectable options include option 638 that when selected by the user causes the device to associate new identifying information (e.g., a new name and photo) with the new group messaging conversation. In some embodiments, when the device detects that option 638 has been selected by the user, the device can prompt the user to provide identifying information for the new group messaging conversation. In some embodiments, user interface 634 includes a cancel option that allows for the user to terminate the process of generating a new group messaging conversation. In FIG. 6F, device 500 detects selection of selectable option 636 (e.g., via a tap of contact 603 on option 636). In response to detecting the selection of option 636, the device 500 displays a user interface 612 (described above with respect to FIG. 6A) for the newly created group messaging conversation as shown in FIG. 6G.

Figure 6H:
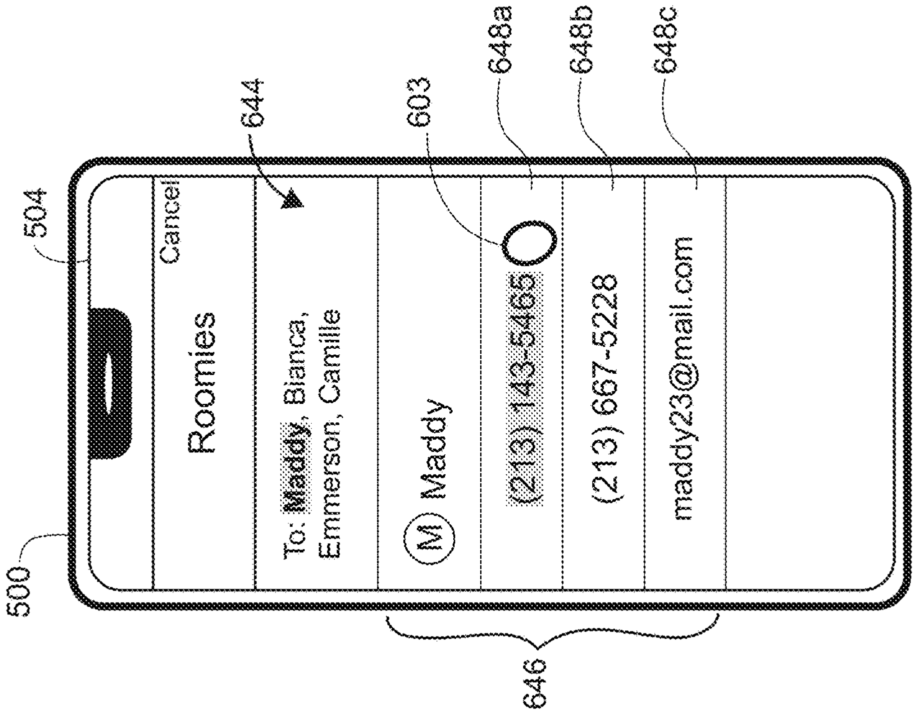
Figure 6G:
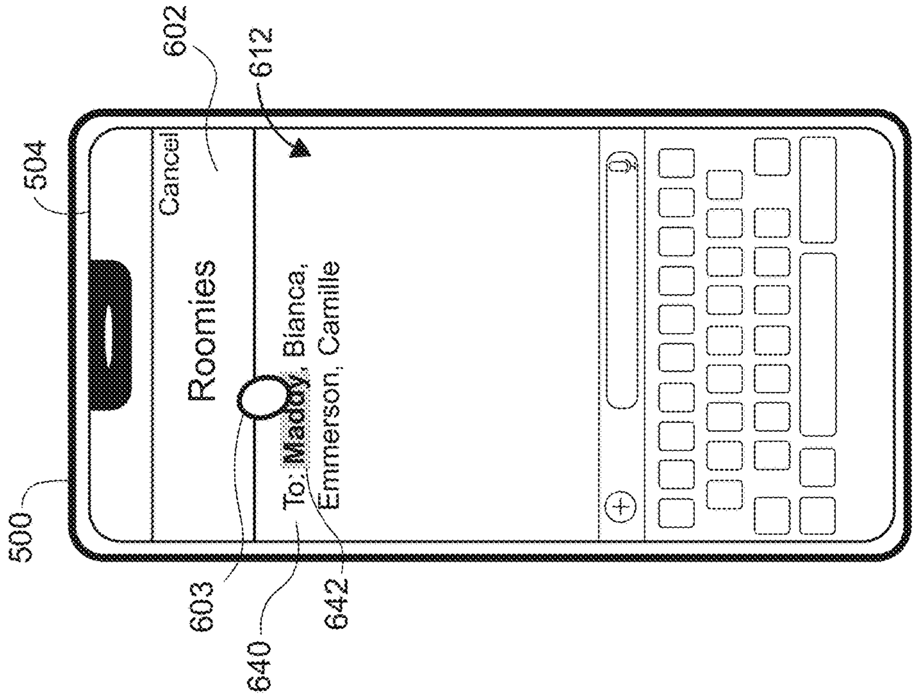

In some embodiments, user interface 612 of FIG. 6G includes a group messaging conversation information portion 602 that includes the identifying information associated with the new group messaging conversation. In FIG. 6G, the conversation information portion 602 includes the same name (e.g., "Roomies") as the previous group messaging conversation since the user opted to keep the same identifying information of the previous group messaging conversation at user interface 634 of FIG. 6F. In some embodiments (and as described in further detail below), in response to the user opting to keep the same identifying information for the new group messaging conversation, the device disassociates the identifying information now being used for the new group messaging conversation from the previous group messaging conversation.

In some embodiments, user interface 612 of FIG. 6G includes a "to" field 640. Optionally, the to field 640 includes a listing of the users that are part of the new group messaging conversation. For instance, as illustrated in FIG. 6G, the to field 640 includes "Camille" who has been newly added to group messaging conversation by the user. In some embodiments, the to field 640 can include one or more selectable names 642. The selectable names 642 indicate users that are part of the group messaging conversation whose electronic messaging identifier is required to be selected by the user to allow for that user to be part of the newly created group messaging conversation. For instance, as illustrated in FIG. 6G, the entry in the to field 640 pertaining to "Maddy" is selectable thus indicating that Maddy requires a selection of an electronic messaging identifier in order to be included as part of the group messaging conversation. Optionally, the selectable names 642 are indicated by the user interface 612 as being selectable using one or more visual indicators. For instance, in FIG. 6G the selectable name 642 pertaining to Maddy is highlighted thereby providing a visual indication to the user that Maddy's electronic messaging identifier requires selection and/or action in order to include Maddy in the group messaging conversation. In FIG. 6G, device 500 detects selection of selectable name 642 (e.g., via a tap of contact 603 on name 642). In response to detecting the selection of name 642, the device 500 displays a user electronic messaging identifier interface 644 as shown in FIG. 6H.

In some embodiments, electronic messaging identifier interface 644 includes an electronic identifier listing portion 646 that includes a listing of the electronic identifiers associated with Maddy based on contact information associated with Maddy that is stored on the electronic device. In some embodiments, electronic identifier listing portion 646 includes one or more selectable options 648A-C that allow for the user to select which of the electronic identifiers associated with Maddy to use for the group messaging conversation. Optionally, one or more selectable options 648A-C include a visual indicator to indicate the option that the device has determined is the best option to use as the electronic messaging identifier for the user. In some embodiments, the device can determine the best option to use based on the type of electronic messaging identifier associated with the option, as well as prior history of the device's interaction with the user. As an example, the device can select the phone number for user based on the most frequently contacted phone number of the user. Additionally or alternatively, the device could select the phone number based on the last phone number that was used by the user of the electronic device to contact the4 user. As illustrated in FIG. 6H, selectable option 648A is highlighted to indicate that the device has determined that the option is the best option to select for Maddy.

Figure 6I:
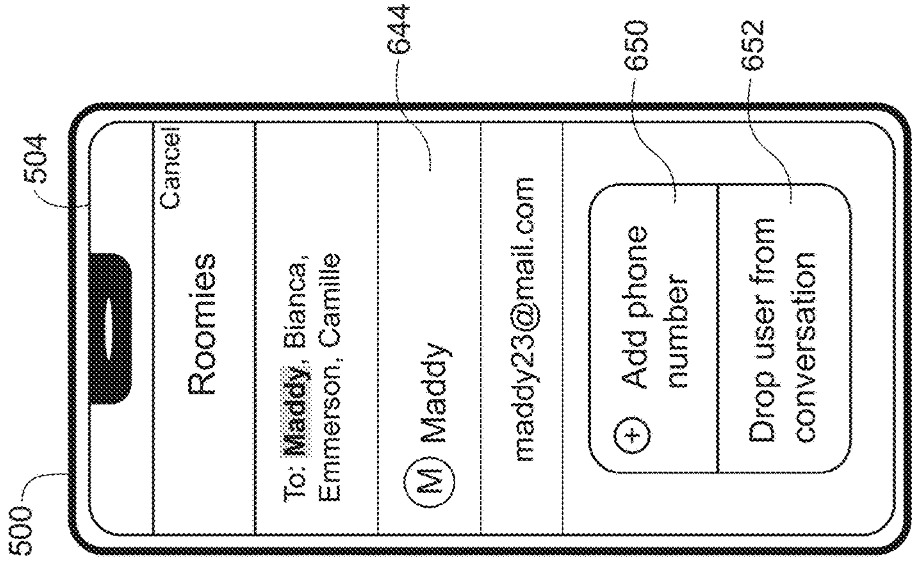

In some embodiments, at FIG. 6G when the device determines that selectable option 642 has been selected by the user, and if the device determines that the user (e.g., Maddy) does not have an electronic messaging identifier that is compatible with the messaging service to be used by the newly created group messaging conversation (e.g., because Maddy's contact information does not include a phone number), the device displays user interface 644 as shown in FIG. 6I. Optionally, user interface 644 includes the same features described above with respect to FIG. 6H, but the user interface 644 also includes a selectable option 650 that allows the user to manually enter an electronic messaging identifier for the user that is compatible with the messaging service to be employed by the group messaging conversation as shown in FIG. 6I. Optionally, the user interface includes a selectable option 652 that causes the device to remove the user (e.g., Maddy) rather than manually add an electronic messaging identifier for the user.

Figure 6J:
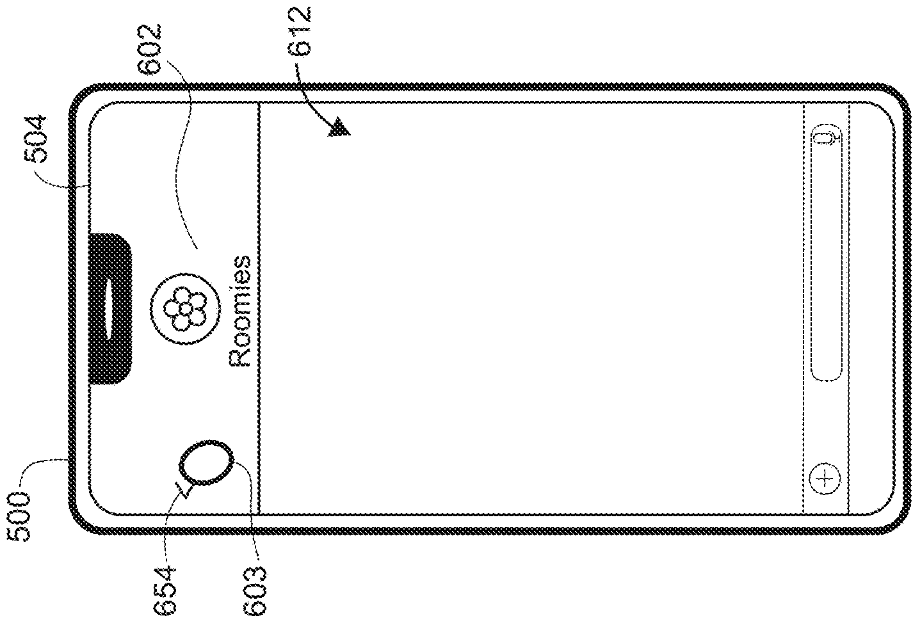
Figure 6K:
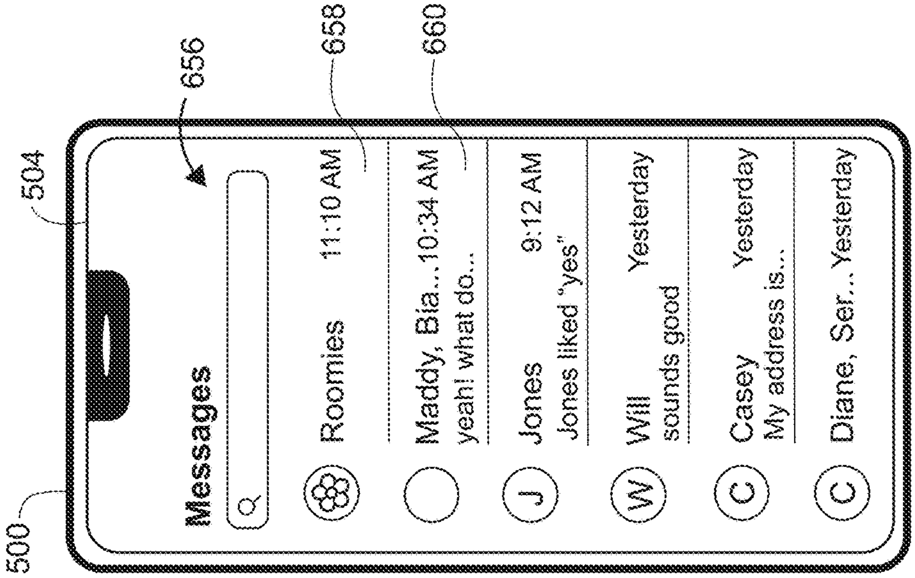
Figure 7A:
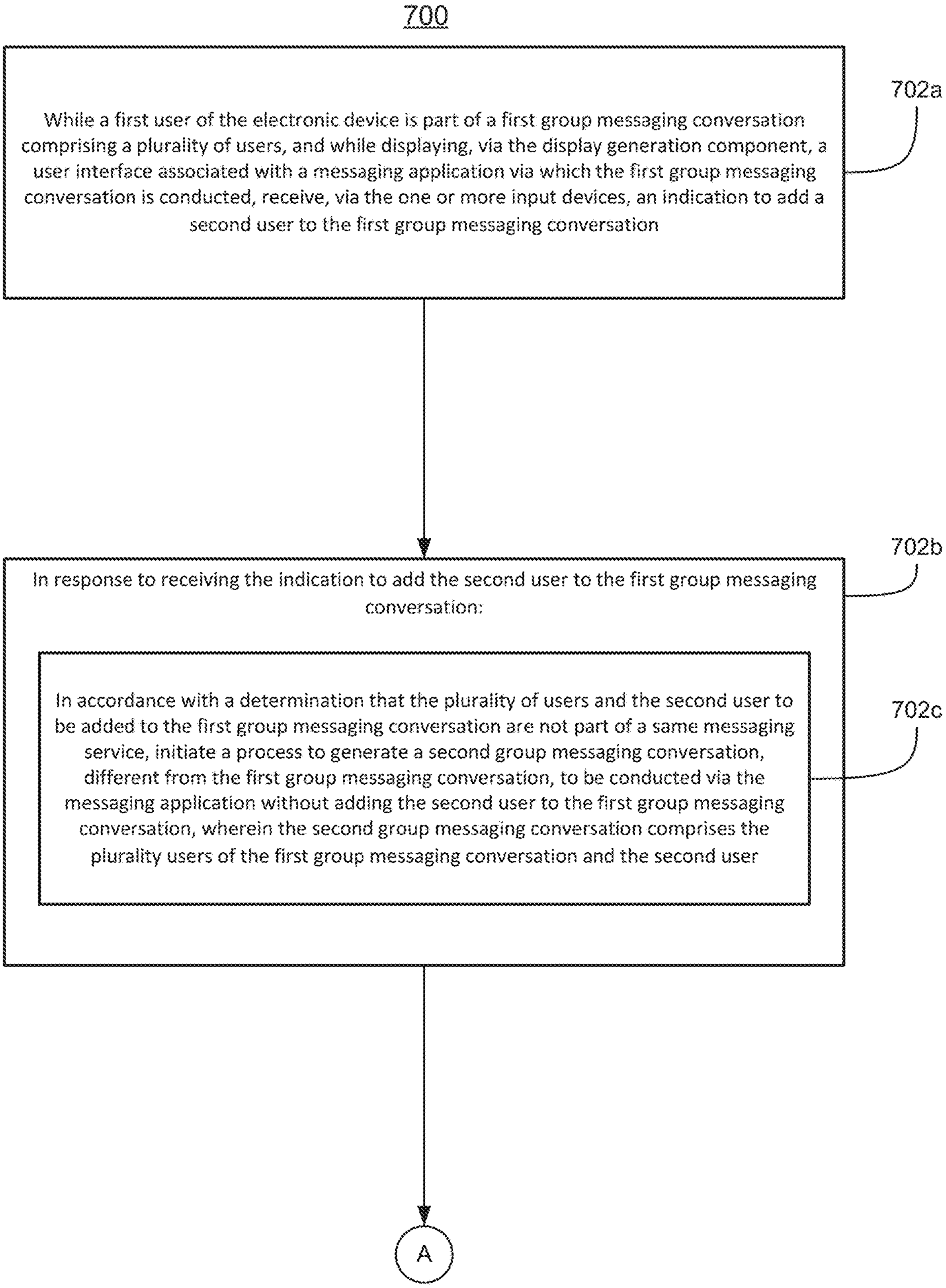
FIGS. 7A-7E is a flow diagram illustrating a method in which an electronic device adds one or more users to a hybrid group messaging conversation in accordance with some embodiments of the disclosure.
Figure 7B:
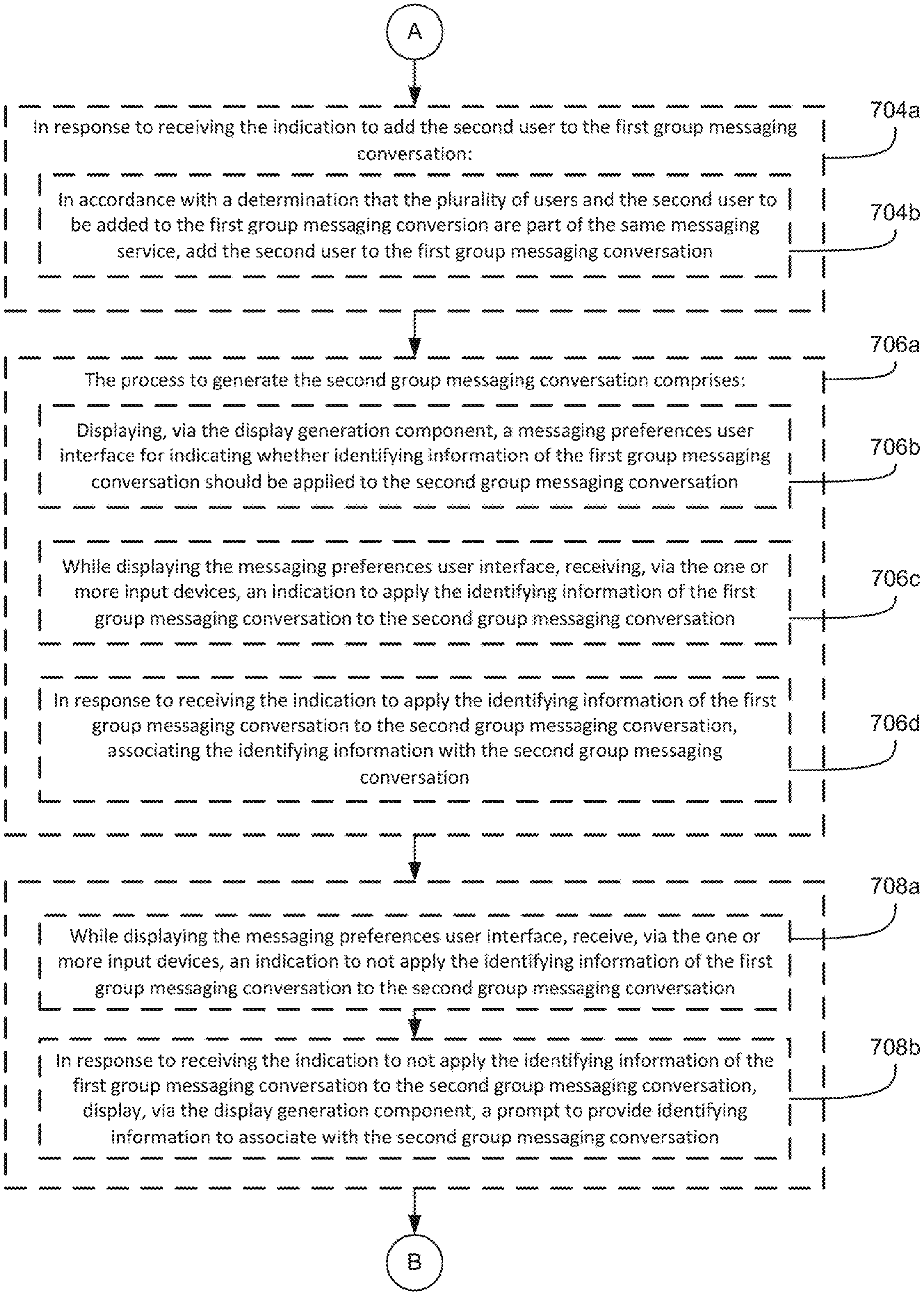
Figure 7C:
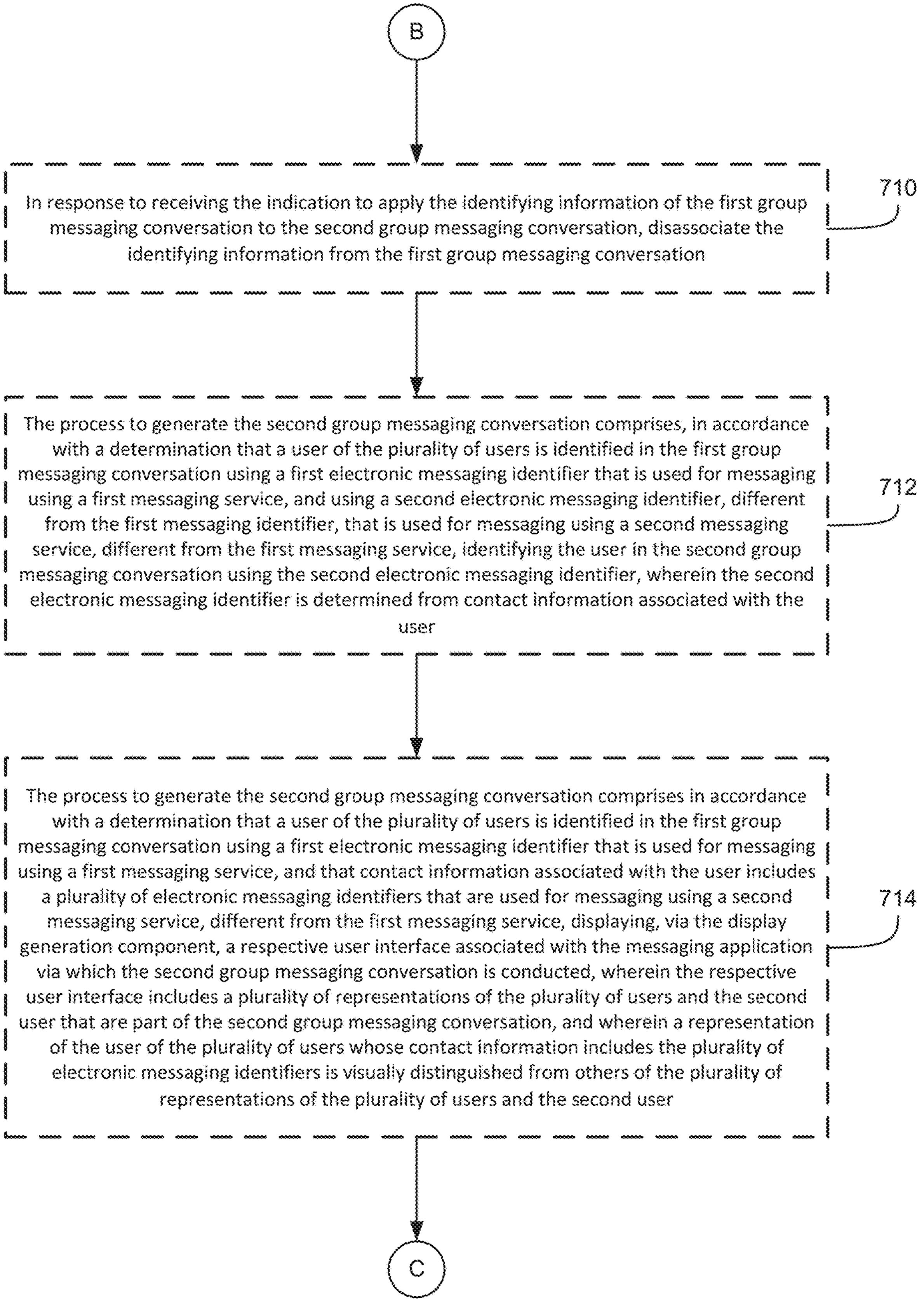
Figure 7D:
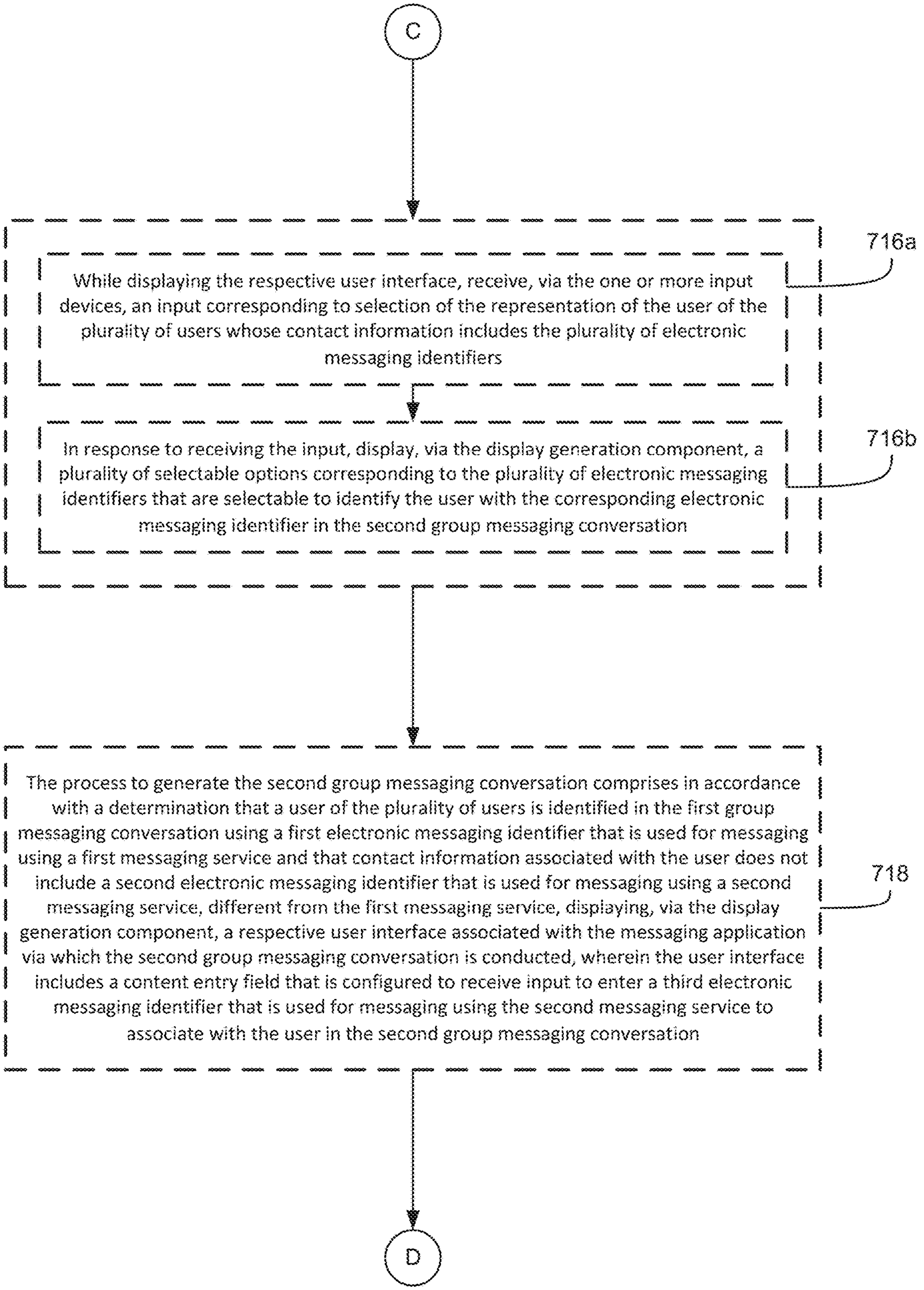
Figure 7E:
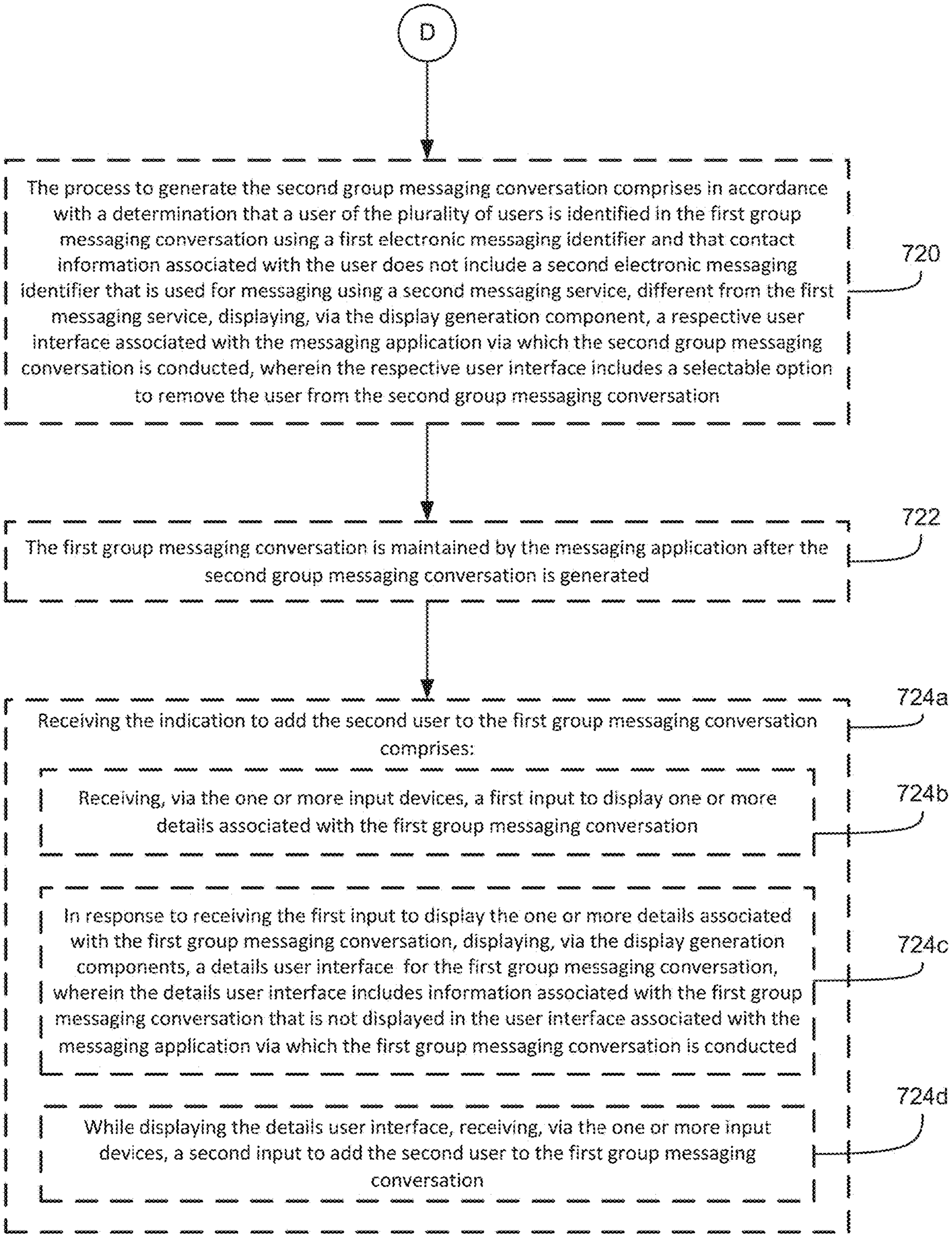

In FIG. 6H, device 500 detects selection of selectable option 648A (e.g., via a tap of contact 603 on option 648A). In response to detecting the selection of option 648A, the device 500 displays a user interface 612 as shown in FIG. 6J. User interface 612 is substantially similar to the user interface 612 of FIG. 6A and includes a listing of all messaging activity taking place on the newly created group messaging conversation (in this case, no messaging activity is listed since the group messaging conversation was just created). As illustrated in FIG. 6J, the identifying information associated with the prior group messaging conversation (e.g., "Roomies" and the phot) are associated with the new group messaging conversation because of the user's prior input to retain the identifying information. User interface 612 of FIG. 6J includes selectable option 654 that when selected by the user causes the device to display a listing of all active conversations maintained by the messaging application. In FIG. 6J, device 500 detects selection of selectable option 654 (e.g., via a tap of contact 603 on option 654). In response to detecting the selection of option 654, the device 500 displays an active message listing user interface 656 as shown in FIG. 6K.

In some embodiments, active messaging listing user interface 656 includes a listing of all or some of the active conversations maintained by the messaging application. For instance, user interface 656 includes entries 658 and 660. Entry 658 lists the newly created group messaging conversation and includes the name and photo (e.g., the identifying information) that was previously selected by the user as discussed above. Entry 660 lists the previous group messaging conversation, however, since the device previously disassociated the identifying information used for the previous group messaging conversation (due to the user selecting to use the same identifying information to the newly created group messaging conversation at contact 603 of FIG. 6F), entry 660 does not include an identifying name or photo for the conversation and instead lists the users associated with the previous group messaging conversation (which does not include the new user, since the new user was never added to the prior group conversation and was only added to the newly generated group messaging conversation), as well as the most recent messaging activity associated with the previous group messaging conversation. The group messaging conversation associated with entry 660 (e.g., the previous group messaging conversation) will only include messaging activity that was present prior to the user generating the new group messaging conversation.

FIGS. 7A-7E is a flow diagram illustrating a method in which an electronic device adds one or more users to a hybrid group messaging conversation in accordance with some embodiments of the disclosure. The method 700 is optionally performed at first and/or electronic devices such as device 100, device 300, or device 500 as described above with reference to FIGS. 1A-1B, 2-3, 4A-4B and 5A-5C. Some operations in method 700 are, optionally combined and/or order of some operations is, optionally, changed.

As described below, the method 700 provides ways in which an electronic device facilitates adding and removing users to a group messaging conversation when the group messaging conversation includes members who use different messaging services (e.g., a hybrid group messaging conversation). Such techniques allow users to modify membership of a hybrid group messaging conversation, without the need for manual user input to create such group messaging conversations.

In some embodiments, method 700 is performed at an electronic device in communication with a display generation component and one or more input devices. For example, the electronic device is a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while a first user of the electronic device is part of a first group messaging conversation comprising a plurality of users, such as in FIG. 6A (e.g., the first group messaging conversation is conducted via a messaging application on the electronic device, and the user of the electronic device has received and/or sent messaging activity to the first group messaging conversation using the messaging application. In some embodiments, one or more of all of the plurality of users receives messaging activity that has been sent to the first group messaging conversation), and while displaying, via the display generation component, a user interface associated with a messaging application via which the first group messaging conversation is conducted (e.g., while displaying a user interface that includes representations of messaging activity that has been sent and/or received in the first group messaging conversation), the electronic device receives (702*a*), via the one or more input devices, an indication to add a second user to the first group messaging conversation, such as the input from contact 603 from FIG. 6B. In some embodiments, the indication to add the second user includes detecting selection of a conversation management option displayed in the user interface, which causes the electronic device to display one or more selectable options for adding one or more users to the first group messaging conversation. In some embodiments, while displaying the management user interface that includes the one or more selectable options, the electronic device detects selection of one of the options corresponding to adding the second user to the first group messaging conversation. In some embodiments, the indication is a touch input on a touch-sensitive surface, a voice input, or a mouse input.

In some embodiments, and in response to receiving the indication to add the second user to the first group messaging conversation (702*b*), in accordance with a determination that the plurality of users and the second user to be added to the first group messaging conversation are not part of a same messaging service (e.g., a service, server or network via which one or more users are able to transmit and/or receive messaging activity to and/or from one another), the electronic devices initiates (702*c*) a process to generate a second group messaging conversation, different from the first group messaging conversation, to be conducted via the messaging application without adding the second user to the first group messaging conversation, such as in FIG. 6E, wherein the second group messaging conversation comprises the plurality users of the first group messaging conversation and the second user. In some embodiments, determining that the plurality of users and the second user to be added to the first group messaging conversation are not part of the same messaging service includes determining that the second user utilizes a messaging service that is different from the messaging service used by the plurality of users. Additionally or alternatively, determining that the plurality of users and the second user to be added to the first group messaging conversation are not part of the same messaging service optionally includes determining that the second user does not utilize the messaging service that the plurality of users of the first group messaging conversation utilize. Additionally or alternatively, determining that the plurality of users and the second user to be added to the first group messaging conversation are not part of the same messaging service optionally includes determining that one or more of the plurality of users of the first group messaging conversation do not utilize the messaging service that other users of the plurality of users utilize. When a group messaging conversation includes users who are utilizing different messaging service, the membership of the group optionally cannot be modified once the group messaging conversation has been created. Thus, when a "mixed" messaging group requires a modification to the membership of the group (e.g., adding an additional user to the group), a new group messaging conversation is created that includes the members from the original group messaging conversation as well as the member to be added. In some embodiments, once a determination has been made that the second user and the plurality of users of the first group messaging conversation are not part of the same messaging service, a process to generate a second group messaging conversation is initiated. In some embodiments, initiating a process to generate a second group messaging conversation includes generating a second group messaging conversation in the messaging application and adding the plurality of users from the first group messaging conversation and the second user to the second group messaging conversation. The second group conversation is optionally distinct from the first group conversation and is not generated by adding the second user to the first group messaging conversation. Instead, a new group messaging conversation is optionally created that includes both the plurality of users from the first group messaging service and the second user. The second group messaging conversation is optionally configured to allow the plurality of users and the second user to send and/or receive messaging activity that is viewed by the first plurality of members as well as the second member. In some embodiments, initiating a process to generate a second group messaging conversation includes providing the users with one or more user interfaces that are configured to confirm that the user wants to create a new group messaging conversation. If the device detects that the user confirms that they want to create a new group messaging conversation, then the device creates the second group messaging conversation. In some embodiments, initiating a process to generate a second group messaging conversation includes providing the first user with one or more user interfaces that are configured to collect the preferences of the first user regarding the second group messaging conversation. In some embodiments, preferences of the first user are used to automatically create the second group messaging conversation and add the plurality of members and the second user to the second group messaging conversation. In some embodiments, after the second group messaging conversation is created, both the first group messaging conversation and the second group messaging conversation are accessible from: 1) the messaging application of the first user and/or 2) the messaging applications of users in the first and/or second group messaging conversations for sending and/or receiving messaging activity (e.g., the users are still able to send/receive messages in the first group messaging conversation). Automatically creating a new messaging conversation when a mixed-service group conversation is implicated allows users that use different messaging services to participate in group messaging activity, including the ability to modify membership in such group messaging activity, without the need for manual user input to create such group messaging conversations.

In some embodiments, in response to receiving the indication to add the second user to the first group messaging conversation (704*a*), in accordance with a determination that the plurality of users and the second user to be added to the first group messaging conversion are part of the same messaging service, the electronic devices adds the second user to the first group messaging conversation (704*b*), such as in FIG. 6D. In some embodiments, determining that the plurality of users and the second user to be added to the first group messaging conversation are part of the same messaging service includes determining that the second user utilizes a messaging service that is the same as one or more users of the plurality of users. In accordance with the determination that the plurality of users and the second user to be added to the first group messaging conversation are part of the same messaging service (e.g., that adding the second user to the first group messaging conversation would not create a hybrid group), the second user is added to the first group messaging conversation without initiating the process to generate the second group messaging conversation. Determining that a user to be added to a group messaging conversation utilizes the same messaging service as the other users in a group messaging conversation, and adding the second user to the first group messaging conversation in response to the determination, avoids creating a new group messaging conversation every time the membership of a group messaging conversation changes thereby reducing the overall number of group messaging conversation that have to be stored on a device and reducing processing resources otherwise needed to create the new conversations.

In some embodiments, the process to generate the second group messaging conversation comprises (706*a*) displaying, via the display generation component, a messaging preferences user interface, such as in FIG. 6F, for indicating whether identifying information of the first group messaging conversation should be applied to the second group messaging conversation (706*b*). In some embodiments the messaging preferences user interface includes one or more selectable options that when selected by the user automatically applies identifying information associated with the first group messaging conversation to the second group messaging conversation. Examples of identifying information include a group name, a photo, or any other media that is used to distinguish and identify a group messaging conversation from other group messaging conversations.

In some embodiments, while displaying the messaging preferences user interface, the electronic device receives (706*c*), via the one or more input devices, an indication to apply the identifying information of the first group messaging conversation to the second group messaging conversation, such as at contact 603 in FIG. 6F. In some embodiments, the indication to apply the identifying information of the first group messaging conversation to the second group messaging conversation includes detecting selection of an option displayed in the messaging preferences user interface to use all (or some) identifying information associated with first group messaging conversation for the second group messaging conversation. Optionally, the messaging preferences user interface includes a plurality of selectable options that allow for the user to select which specific pieces of identifying information associated with the first group messaging conversation to apply to the second group messaging conversation.

In some embodiments, in response to receiving the indication to apply the identifying information of the first group messaging conversation to the second group messaging conversation, the electronic device associates (706*d*) the identifying information with the second group messaging conversation, such as the name Roomies in FIG. 6G. In some embodiments, associating the identifying information with the second group messaging conversation includes copying the identifying information associated with the first group messaging conversation and storing the copied information in a memory location that is associated with the identifying information for the second group messaging conversation. For instance, the user via the messaging preferences user interface optionally indicates to use a name and/or photo associated with the first group messaging conversation for the second group messaging conversation. The name and/or photo associated with the first group messaging conversation are optionally copied and stored as identifying information associated with the second group messaging conversation. Allowing the user to reuse identifying information when generating a new group messaging conversation in response to a change in the membership of prior group messaging conversation allows users to readily identify the relationship between two or more group messaging conversations, thus minimizing cognitive load on the user and leading to a more efficient user experience on the device and reducing errors in providing identifying information for the new group messaging conversation, thus reducing the need for user inputs to correct those errors.

In some embodiments, while displaying the messaging preferences user interface, the electronic device receives (708*a*), via the one or more input devices, an indication to not apply the identifying information of the first group messaging conversation to the second group messaging conversation, such as if contact 603 in FIG. 6F were detected by device selecting option 638 In some embodiments, the messaging preferences user interface includes a selectable option that allows for a user to indicate that they do not want to associate any (or some) identifying information associated with the first group messaging conversation with the second group messaging conversation.

In some embodiments, in response to receiving the indication to not apply the identifying information of the first group messaging conversation to the second group messaging conversation, the electronic device displays (708*b*), via the display generation component, a prompt to provide identifying information to associate with the second group messaging conversation, for instance if contact 603 in FIG. 6F were detected by the electronic device selection option 638. In some embodiments, in response to receiving the indication to not apply the identifying information of the first group messaging conversation to the second group messaging conversation, the user is prompted to manually enter identifying information to associate with the second group messaging conversation. For instance, if the user declines to reuse the group name and/or photo associated with the first group messaging conversation, the user is prompted to provide a new photo and/or name for the second group messaging conversation. Optionally, the device detects one or more inputs from the user, via the one or more input devices, manually providing the identifying info to associate with the second group messaging conversation. Optionally, the prompt includes a selectable option that allows for the user to indicate that they do not want to provide any identifying information for the second group messaging conversation. Optionally, when the selectable option that allows for the user to indicate that they do not want to provide any identifying information for the second group messaging conversation is selected by the user, the first group messaging conversation maintains its identifying information. Allowing the user the option to not reuse identifying information associated with the first group messaging conversation for the second group messaging conversation provides the user with control over how their group messaging conversations are organized thus allowing for customization of the user experience on the device and reducing the need for user inputs to provide identifying information for every group messaging conversation stored on the device.

In some embodiments, in response to receiving the indication to apply the identifying information of the first group messaging conversation to the second group messaging conversation, the electronic device disassociates (710) the identifying information from the first group messaging conversation, such as in FIG. 6K wherein the first group messaging conversation in no longer identified with the name Roomies. In some embodiments, if the user provides an indication, via the messaging preferences user interface, to use the identifying information associated with first group messaging conversation for the second group conversation, then optionally, the identifying information is from the first group messaging conversation once it has been associated with the second group messaging conversation. Optionally, disassociating the identifying information from the group messaging conversation includes deleting in memory the identifying information from a location in memory associated with storage of identifying information associated with the first group messaging conversation. Optionally, disassociating the identifying information from a group messaging conversation includes disassociating an image from the group messaging conversation, disassociating a name from the group messaging conversation, and includes instead, identifying the group messaging conversation with the names of the users associated the group messaging conversation. Disassociating the identifying information from a group messaging conversation when a user reuses the identifying information for a different group messaging conversation ensures that the same identifying information is not used for two different group messaging conversation, thereby minimizing user confusion when viewing multiple group messaging conversations on a messaging application and reducing the amount of erroneous inputs applied by the user to the device.

In some embodiments, the process to generate the second group messaging conversation comprises, in accordance with a determination that a user of the plurality of users is identified in the first group messaging conversation using a first electronic messaging identifier that is used for messaging using a first messaging service, and using a second electronic messaging identifier, different from the first messaging identifier, that is used for messaging using a second messaging service, different from the first messaging service, the electronic device identifies (712) the user in the second group messaging conversation using the second electronic messaging identifier, wherein the second electronic messaging identifier is determined from contact information associated with the user, such as in FIG. 6G. In some embodiments, the first electronic messaging identifier used to identify the user in the first group messaging conversation, while being compatible with the messaging service employed by the first group conversation, may not be compatible with the messaging service used by the second group messaging conversation. Thus, to facilitate the participation of the user is the second group messaging conversation, the process to generate the second group messaging conversation includes determining that the user's contact information includes a second electronic messaging identifier that is compatible with the messaging service used by the second group messaging conversation and using the second electronic messaging identifier to identify the user in the second group messaging conversation. As an example, if a user employs an electronic messaging identifier (e.g., an email address) in the first group conversation, but electronic messaging identifiers are not compatible with the messaging service used in the second group messaging service, then the process to generate the second group messaging conversation includes determining if the user has a phone number (which is compatible with the second messaging service) stored in contact information associated with the user and using the phone number to identify the user in the second group messaging conversation instead. In some embodiments the contact information associated with the users of the group messaging conversation is stored on the electronic device (e.g., in a contacts or address book application on the electronic device). Optionally, the contact information associated with the users is stored on a separate device which is accessed by the electronic device Automatically switching a user's identifying information to a form compatible with a new group messaging conversation allows the user to participate in the second group messaging conversation without the need for manual user input to enter identifying information that is compatible with the new group messaging conversation.

In some embodiments, the process to generate the second group messaging conversation comprises in accordance with a determination that a user of the plurality of users is identified in the first group messaging conversation using a first electronic messaging identifier that is used for messaging using a first messaging service, and that contact information associated with the user includes a plurality of electronic messaging identifiers that are used for messaging using a second messaging service, different from the first messaging service, the electronic device displays (714), via the display generation component, a respective user interface associated with the messaging application via which the second group messaging conversation is conducted, wherein the respective user interface includes a plurality of representations of the plurality of users and the second user that are part of the second group messaging conversation, such as to field 640 of FIG. 6G, and wherein a representation of the user of the plurality of users whose contact information includes the plurality of electronic messaging identifiers is visually distinguished from others of the plurality of representations of the plurality of users and the second user, such as Maddy in FIG. 6G. In some embodiments, once the second group messaging conversation has been created, the user interface that is used to conduct the second group messaging conversation on the messaging application includes a listing of the users who are associated with the second group messaging conversation. Optionally, the listing of the users is displayed in a "to" field of the user interface used to conduct the group messaging conversation. In some embodiments, the users whose contact information includes multiple electronic messaging identifiers that is used for the messaging service associated with the second group messaging conversation, and that require the user to select one of the messaging identifiers out of the multiple messaging identifiers to use, are visually distinguished in the listing of the users who are associated with the second group messaging conversation thereby indicating to the user that a selection of electronic messaging identifier is needed for those users. In some embodiments, the other members whose names are visually distinguished from the users whose contact information includes the plurality of electronic messaging identifiers include users whose electronic identifier messaging identifier to use in the second group messaging conversation does not require selection by the user. Optionally, visually distinguishing the listing of the users includes visually highlighting the listing with a specific color, using a specific-colored font, using a different font size (e.g., larger), or using a different font in the listing of users. Providing a visually distinguishable representation of the users whose electronic messaging identifier needs to be selected by the user allows for the user to quickly and efficiently set up a new group messaging conversation without having to manually provide input for reviewing the electronic messaging identifier for every member of the group messaging conversation thus avoiding inputs needed to fix errors associated with manually providing the input.

In some embodiments, while displaying the respective user interface, the electronic device receives (716*a*), via the one or more input devices, an input corresponding to selection of the representation of the user of the plurality of users whose contact information includes the plurality of electronic messaging identifiers, such as contact 603 in FIG. 6G. In some embodiments, receiving an input via the one or more input devices includes receiving a tap on a touchscreen at the location corresponding to the representation. Optionally, receiving the input via the one or more input devices includes receiving a mouse click at the location of a display corresponding to the representation. In some embodiments, the users whose contact information includes a plurality of electronic messaging identifiers, is selectable on the list so that the user can identify which electronic messaging identifier to use from the plurality of electronic messaging identifiers in the second group messaging conversation.

In some embodiments, in response to receiving the input, the electronic device displays (716*b*), via the display generation component, a plurality of selectable options corresponding to the plurality of electronic messaging identifiers that are selectable to identify the user with the corresponding electronic messaging identifier in the second group messaging conversation, such as selectable options 648A-C in FIG. 6H. In some embodiments, when the user selects a user from the list whose contact information includes a plurality of electronic messaging identifiers, the user is presented with a list of the plurality of electronic identifiers and selects an electronic messaging identifier from the plurality of electronic messaging identifiers to use for the second group messaging conversation. In some embodiments, the electronic device receives an input selecting an electronic messaging identifier of the plurality of electronic messaging identifiers and identifies the user in the second group messaging conversation using the selected electronic messaging identifier. Providing the user with a selectable list of electronic identifiers that is used for the second group messaging conversation, allows for the user to efficiently choose an electronic identifier to associate with each user of the second group messaging conversation thereby reducing avoiding requiring the user to manually input the electronic messaging identifier, and therefore minimize erroneous user inputs applied to the electronic device.

In some embodiments, the process to generate the second group messaging conversation performed by the electronic device comprises in accordance with a determination that a user of the plurality of users is identified in the first group messaging conversation using a first electronic messaging identifier that is used for messaging using a first messaging service and that contact information associated with the user does not include a second electronic messaging identifier that is used for messaging using a second messaging service, different from the first messaging service, displaying (718), via the display generation component, a respective user interface associated with the messaging application via which the second group messaging conversation is conducted, wherein the user interface includes a content entry field that is configured to receive input to enter a third electronic messaging identifier that is used for messaging using the second messaging service to associate with the user in the second group messaging conversation, such as in FIG. 6I. In some embodiments, if a user of the first group messaging conversation does not have an electronic messaging identifier that is used with the messaging service associated with the second group messaging conversation, the user is prompted to manually enter an electronic messaging identifier to associate with the user that is used on the second group messaging conversation. Optionally, prompting the user to manually enter an electronic messaging identifier includes providing the user with a content entry field on the user interface which allows the user to manually enter the electronic messaging identifier. In some embodiments, the electronic device receives one or more inputs providing the electronic messaging identifier and identifies the user in the second group messaging conversation using the provided electronic messaging identifier. Allowing the user the ability to manually enter an electronic messaging identifier for a particular user of the group messaging conversation ensures that a new group messaging conversation includes every desired member that was part of a prior group messaging conversation thereby minimizing the number of separate group messaging conversation stored on the electronic device.

In some embodiments, the process to generate the second group messaging conversation performed by the electronic device comprises in accordance with a determination that a user of the plurality of users is identified in the first group messaging conversation using a first electronic messaging identifier and that contact information associated with the user does not include a second electronic messaging identifier that is used for messaging using a second messaging service, different from the first messaging service, displaying (720), via the display generation component, a respective user interface associated with the messaging application via which the second group messaging conversation is conducted, wherein the respective user interface includes a selectable option to remove the user from the second group messaging conversation, such as selectable option 652 in FIG. 6I. In some embodiments, if a user of the first group messaging conversation does not have an electronic messaging identifier that is used with the messaging service associated with the second group messaging conversation, the user of the device is presented with a selectable option on the user interface to remove the user of the first group messaging conversation from the second group messaging conversation. In some embodiments, when the device receives an input from the user corresponding to selection of the selectable option, the device disassociates the user of the first group messaging conversation from the second group messaging conversation. Optionally, disassociating the user from the second group messaging conversation includes forgoing adding the user of the first group messaging conversation to the second group messaging conversation. Allowing the user to remove a user for whom they don't have an electronic messaging identifier that can be used in a newly generated group messaging conversation ensures that the user can still generate a new group messaging conversation even if one or more users from a prior group messaging conversation (that was used to create the new group messaging conversation) does not have an electronic messaging identifier that can be used with the new group messaging conversation thus allowing for the device to generate new group messaging conversations to accommodate user requests even in the absence of complete information about each user of a group messaging conversation.

In some embodiments, the first group messaging conversation is maintained (722) by the messaging application after the second group messaging conversation is generated, such as in FIG. 6K. In some embodiments, when the second group messaging conversation is generated, both the first group messaging conversation and the second group messaging conversation are maintained by the messaging application. Optionally, maintaining the first and second group messaging conversations includes displaying both the first and second group messaging conversation in a list of active conversations on the messaging application (e.g., such as described with reference to method 900) and providing the user with the ability to view messaging activity associated with both group messaging conversations. Maintaining a prior group messaging conversation on the messaging application even when a new group messaging conversation has been generated based on the prior group messaging conversation allows for the user to have access to older messaging activity that was part of the prior group messaging conversation thereby ensuring a complete record of messaging activity associated with the user of the device, thus allowing the device to generate new group messaging conversations without losing information from prior group messaging conversations.

In some embodiments, receiving (724*a*) the indication to add the second user to the first group messaging conversation at the electronic device comprises receiving (724*b*), via the one or more input devices, a first input to display one or more details associated with the first group messaging conversation, such as contact 603 in FIG. 6A. In some embodiments, receiving the first input to display one or more details associated with the first group messaging conversation includes the device receiving a selection from user of the device selecting the name (or other identifying information) of the first group messaging conversation displayed on a user interface on which the first group messaging conversation is conducted on the messaging application (e.g., the user interface that includes representations of the messaging activity included in the first group messaging conversation). Optionally, receiving the first input includes the device receiving a selection from the user of the device selecting the photo (or other identifying information) of the first group messaging conversation displayed on the user interface. In some embodiments, the selection of the identifying information corresponds to the selection of the conversation management option described with reference to method 700. In some embodiments, the first input is a touch input on a touch-sensitive surface, a voice input, or a mouse input.

In some embodiments, in response to receiving the first input to display the one or more details associated with the first group messaging conversation, the electronic device displays (724*c*), via the display generation components, a details user interface (e.g., the management user interface described with reference to method 700) for the first group messaging conversation, wherein the details user interface includes information associated with the first group messaging conversation that is not displayed in the user interface associated with the messaging application via which the first group messaging conversation is conducted, such as user interface 614 of FIG. 6B. In some embodiments, the details user interface for the first group messaging conversation includes information associated with the first group messaging conversation including but not limited to, the name associated with the first group messaging conversation, a picture associated with the first group messaging conversation, and/or other identifying information associated with the first group messaging conversation, a listing of the users associated with the first group messaging conversation, and/or a selectable option to add a new user to the first group messaging conversation.

In some embodiments, while displaying the details user interface, the electronic device receives (724*d*), via the one or more input devices, a second input to add the second user to the first group messaging conversation, such as contact 603 in FIG. 6B. In some embodiments, receiving the second input to add the second user to the first group messaging conversation includes the device receiving a selection from the user selecting the option to add a new user to the first group messaging conversation at the details user interface for the first group messaging conversation. In some embodiments, in response to the selection from the user to a dd a new user to the first group messaging conversation, the device displays one or more user interfaces for indicating the identifier identifying the added user (e.g., from contact information stored in an address book application, from manual entry of identifier(s) (e.g., phone number, email address), etc.) Allowing the user to indicate their desire to add a new user to the group messaging conversation at a user interface that is separate from the user interface that is used to display messaging activity of the group messaging conversation, allows for the user interface on which the group messaging conversation is conducted on to display more messaging activity on a single display.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7E. For example, the operation of the electronic device to add a user to a hybrid group messaging conversation with reference to method 700 optionally has one or more characteristics of the deletion of a hybrid group messaging conversation with reference to other methods described herein (e.g., method 900). In another example, hybrid and non-hybrid group messaging conversations of the methods 700 and 800 share one or more characteristics. Additionally, the messaging interactions described with reference to method 700 optionally have one or more characteristics of the messaging interactions described with reference to method 900. For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 7A-7E are, optionally, implemented by components depicted in FIGS. 1A-1B. For example, displaying operation 702*a*, receiving operation 702*a*, and initiating operation 702*c* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Sending and/or Receiving Messages

Similar to adding a user to a hybrid group messaging conversation (or adding a user to a non-hybrid group messaging conversation that would cause the group messaging conversation to become a hybrid conversation), leaving a hybrid group messaging conversation can also present challenges to the electronic device. In some circumstances, a user of a messaging application that facilitates group messaging conversations may wish to no longer view the group messaging conversation (e.g., the user wants to delete the group messaging conversation) nor receive new messaging activity associated with the group messaging conversation (e.g., the user wants to block future messaging activity received on the group messaging conversation). However, in circumstances where the group messaging conversation is a hybrid group messaging conversation, the messaging service used to facilitate the group messaging conversation, may not facilitate deleting and blocking a group messaging conversation. In some circumstances, if the group messaging conversation is a hybrid conversation, the user may be able to delete a group messaging conversation, but if an external user who is also part of the group messaging conversation sends new messaging activity to the group conversation, the electronic device will receive the new messaging activity and display the messaging activity as a new active group messaging conversation. In some circumstances, the user will have to repeat the process of deleting the group messaging conversation each time new messaging activity is received at the group messaging conversation because they are unable to block the new messaging activity. Requiring the user to engage in a process to delete the group messaging conversation each time new messaging activity is received on the group messaging conversation can lead to erroneous inputs on the device and consume computing resources on the device. The embodiments described below provide ways in which an electronic device provides efficient user interfaces for deleting and blocking a hybrid group messaging conversation, thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8J illustrate exemplary ways in which an electronic device displays user interfaces for deleting and blocking a hybrid group messaging conversation. The embodiments in these figures are used to illustrate the processes described below, including the processes described with reference to FIG. 9. Although FIGS. 8A-8J illustrate various examples of ways an electronic device is able to perform the processes described below with respect to FIG. 9, it should be understood that these examples are not meant to be limiting, and the electronic device is able to perform one or more processes described below with reference to FIG. 9 in ways not expressly described with reference to FIGS. 8A-8J.

Figure 8A:
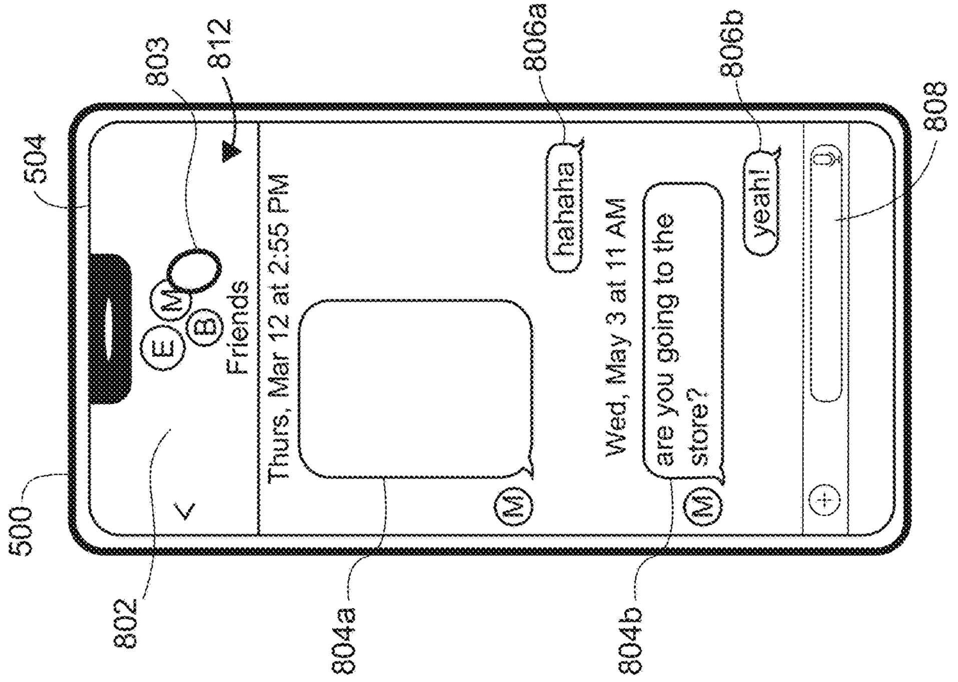
FIGS. 8A-8J illustrate examples of an electronic device deleting a hybrid group messaging conversation in accordance with some embodiments of the disclosure.

FIG. 8A illustrates an exemplary device 500 displaying a user interface 812. In some embodiments, the user interface 812 is displayed via a display generation component. In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device.

As shown in FIG. 8A, the electronic device 500 displays a messaging user interface 812 (e.g., of a messaging application installed on device 500) on touch screen 504. In some embodiments, user interface 812 is any user interface that displays information about one or more messaging conversations including one or more group messaging conversations. In FIG. 8A, the messaging user interface 812 includes messaging activity pertaining to a group messaging conversation labeled as "Friends." The user interface 812 includes a group messaging conversation information portion 802 that displays the name of the group (e.g., Friends). Optionally, the conversation information portion 802 of user interface 812, in addition to including the name of the group messaging conversation, also includes a photo associated with the group messaging conversation, similar to information portion 602 in FIG. 6A. While the example of FIG. 8 describes hybrid group messaging conversations as including identifying information such as a name and photo, the disclosure should not be seen as limiting. In some embodiments, a hybrid group messaging conversation will not include identifying information associated with it due to either the user of the electronic device not providing any identifying information or because the messaging application does not allow for identifying information to be associated with a hybrid group messaging conversation. The systems and processes described below are applicable to all hybrid group messaging conversations, regardless of whether the hybrid group messaging conversation includes identifying information.

In some embodiments, the user interface 812 of the messaging application illustrated in FIG. 8A includes messaging activity associated with the group messaging conversation. For instance, and as illustrated in FIG. 8A, the user interface 812 includes messaging activity 804A-B from a first user of the group messaging and includes messaging activity 806A-B from the user of the electronic device on which the messaging application is running. FIG. 8A illustrates a hybrid group messaging conversation, in which one or more users that are part of the group messaging conversation utilize a different messaging service than one or more other users to interact with the group messaging conversation, such as described with reference to FIG. 6G and methods 700 and/or 900. Optionally, the user interface 812 includes one or more visual indicators that identify the group messaging conversation as being a hybrid group messaging conversation. For example, messaging activity 806A-B on user interface 812 is colored/highlighted to indicate that the Friends group messaging conversation is a hybrid group messaging conversation. In some embodiments, messaging activity 804A-B includes the same color/highlighting to indicate that the Friends group messaging conversation is a hybrid group messaging conversation. The color/highlighting of Friends group messaging conversation is different than the color/highlighting of the Roomies group messaging conversation of FIG. 6A, since the Roomies conversation is a non-hybrid group messaging conversation. In some embodiments, the user interface 812 includes a messaging activity entry portion 808 (e.g., a text or content entry field) that is selectable by the user of the electronic device and receives entry of messaging activity (such as text) that is then displayed in user interface 812 as part of the group messaging conversation.

Figure 8B:
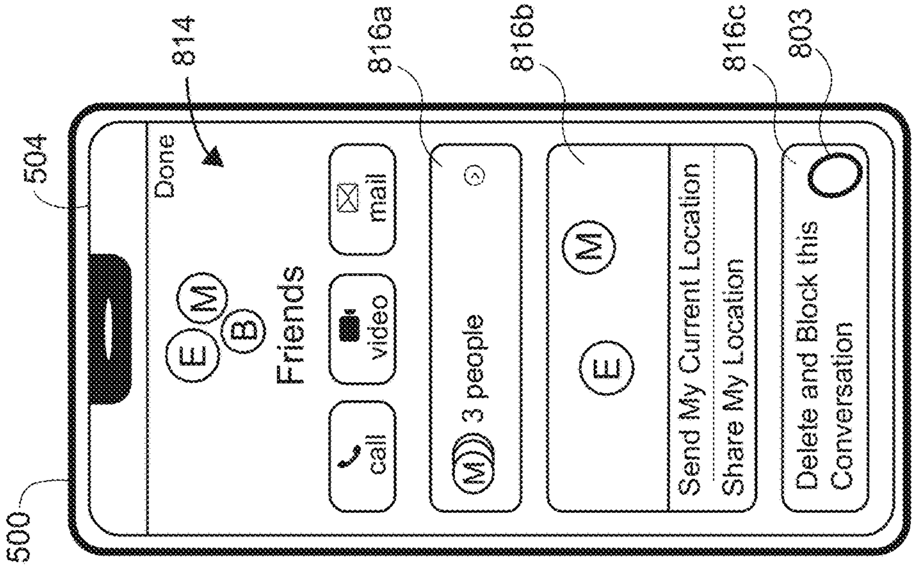

In some embodiments, group conversation information portion 802 is selectable. In FIG. 8A, device 500 detects selection of portion 802 (e.g., via a tap of contact 803 on portion 802). In response to detecting the selection of portion 802, device 500 displays a group messaging conversation information user interface 814 of the messaging application as shown in FIG. 8B, and similar to the user interface 614 in FIG. 6B. Group messaging conversation information user interface 814 includes various selectable options 816A-C to perform various operations associated with the group messaging conversation. For example, user interface 814 optionally includes selectable option 816A that when selected causes the device to display information about one or more users associated with the selectable option. For instance, when an indication is received at the device 500 (e.g., by a tap on the touchscreen) that the user has selected option 816A, the device can display a user interface that includes contact information associated with the selectable option. Optionally, user interface 814 includes selectable option 816B that when selected causes the device to display information about a location of the one or more users associated with the selectable option. For instance, when an indication is received at the device 500 (e.g., by a tap on the touchscreen) that the user has selected option 816B, the device can display a user interface that includes a map that includes the location of the users associated with selectable option 816B.

In certain circumstances, the user of the electronic device may want to remove themselves from a group messaging conversation by may be unable to do so since the group messaging conversation is a hybrid conversation. In the event that the group messaging conversation is a hybrid conversation, the user can instead delete and block the group messaging conversation as described below. In some embodiments, the user interface 814 includes selectable option 816C to delete and block the group messaging conversation. In FIG. 8B, device 500 detects selection of selectable option 816C (e.g., via a tap of contact on option 816C). In response to detecting the selection of option 816C to delete and block the group messaging conversation, the device determines whether the group messaging conversation is a hybrid group messaging conversation or a non-hybrid group messaging conversation. If the device determines that the group messaging conversation is a hybrid group messaging and in response to detecting the selection of option 816C to delete and block the group messaging conversation, the device removes the group messaging from an active messages collection of the messaging application and stores the group messaging in a deleted messages collection of the messaging application (described in further detail below). In the event that the group messaging conversation is a non-hybrid conversation, the user can simply leave the group messaging conversation, and will no longer receive messaging activity transmitted to the group messaging conversation.

Figure 8D:
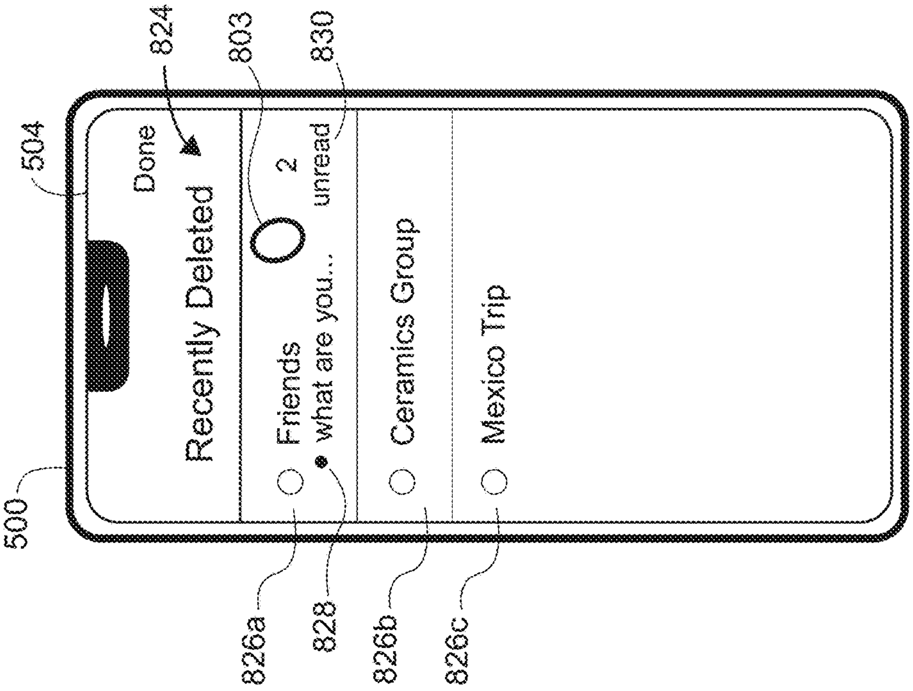
Figure 8C:
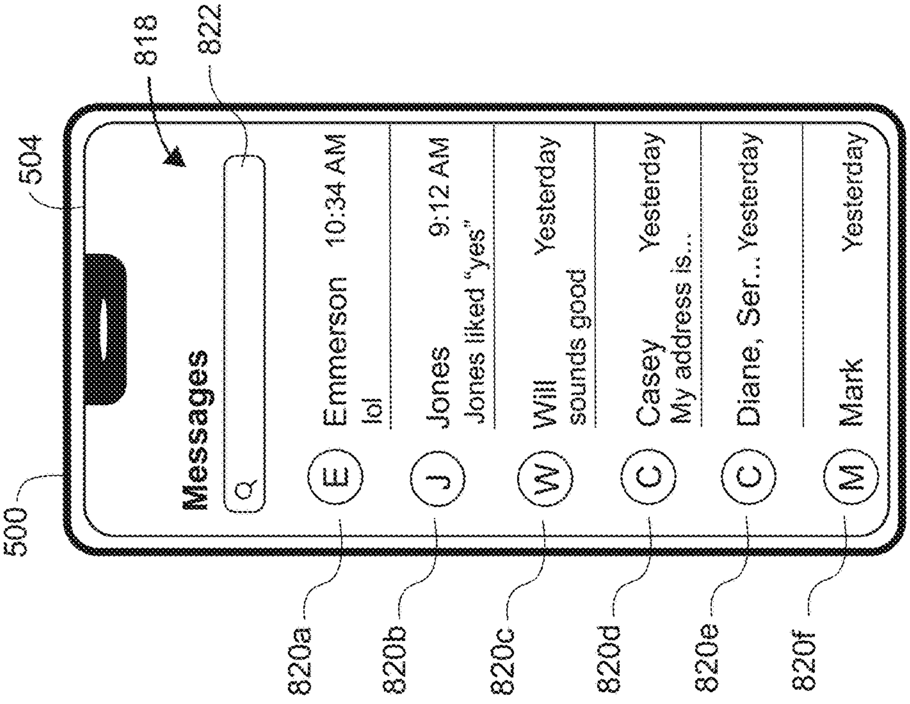

FIG. 8C illustrates an active messages collection user interface 818. In some embodiments, the active messages collection user interface 818 displays one or more active messaging conversations. An "active" messaging conversation can refer to a messaging conversation that is actively displayed by the device via the messaging application to the user when the user interacts with the messaging application. In some embodiments, messaging conversations (group or otherwise) that are part of the active messages collection of the messaging application are automatically displayed to the user on the active messages collection user interface when the user interacts with the messaging application. In some embodiments, the active messages collection user interface 818 includes one or more messaging conversation entries 820A-F that display information about each group messaging conversation that is stored on the active messages collection. Optionally, the information displayed at each entry 820A-F includes information about the user or users that are part of the messaging conversation, information about messaging activity received at each messaging conversation associated with entries 820A-F, and in the event that an entry is a group messaging conversation, identifying information associated with the group messaging conversation, including but not limited to a name and/or photo associated with the group messaging conversation.

In some embodiments, the electronic device in response to detecting that the user of the electronic device selected option 816C at FIG. 8B, removes the group messaging conversation (that the user indicated to be deleted and blocked) from the active messages collection. Thus, as illustrated at FIG. 8C, the Friends group messaging conversation that was deleted and blocked by the user no longer appears in the active messages collection user interface 818. Additionally, in response to the user of the electronic device selecting option 816C at FIG. 8B, the group messaging conversation is moved from the active messages collection to a deleted messages collection as illustrated at FIG. 8D. FIG. 8D illustrates a deleted messages collection user interface 824 of the messaging application. In some embodiments, the deleted messages collection includes messaging conversations (group or otherwise) that have been indicated by the user of the electronic device for deletion. In some embodiments, messaging conversations stored on the deleted messages collection are accessible by the user, however they are not actively displayed by the messaging application unless the user specifically navigates to the deleted messages collection user interface 824 on the messaging application. In some embodiments, the deleted messages collection user interface 824 includes one or more selectable entries 826A-C. In some embodiments, selectable entries 826A-C display information about each group messaging conversation that is stored on the deleted messages collection. Optionally, the information displayed at each entry 826A-C includes information about the user or users that are part of the messaging conversation, information about messaging activity received at each messaging conversation associated with entries 826A-C, and in the event that an entry is a group messaging conversation, identifying information associated with the group messaging conversation, including but not limited to a name and/or photo associated with the group messaging conversation.

In some embodiments, in response to the user of the electronic device selecting option 816C at FIG. 8B, the group messaging conversation (that the user indicated to be deleted and blocked) is removed from the active messages collection and stored in the deleted messages collection. Thus, as illustrated at FIG. 8D, the Friends group messaging conversation that was deleted and blocked by the user now appears in the deleted messages collection user interface 824 (having been removed from the active messages collection 818 as described above). In some embodiments, a deleted and blocked hybrid group messaging conversation receives messaging activity directed to the group messaging conversation even while being stored on the deleted messages collection. In contrast, when a non-hybrid group messaging conversation is moved to the deleted messages collection, the conversation will not receive further messaging and will be inactive. For instance, as illustrated at FIG. 8D, selectable entry 826A associated with the Friends group messaging conversation includes messaging activity indicator 828 that indicates that the group messaging conversation has received new messaging activity (since the last time the group messaging conversation was accessed by the user at the electronic device and/or since the group messaging conversation was moved to the deleted messages collection). Optionally, messaging activity indicator 828 includes a visual indicator (such as a colored dot or other shape) indicating that the group messaging conversation has received new messaging activity. Optionally, messaging activity indicator 828 includes at least a "snippet" (e.g., a portion) of the most recent messaging activity received at the group messaging conversation that has not been accessed by the user. In some embodiments, selectable entry 826A associated with the Friends group messaging conversation includes numerical indicator 830 that indicates the number of messages (e.g., messaging activity) that has been received at the group messaging conversation since the last time the user access the group messaging conversation.

In some embodiments, while a messaging conversation is a part of the deleted messages collection, messaging activity associated with the messaging conversation is stored as part of the deleted messages collection for a pre-determined amount of time. When the pre-determined time has been exceeded, the messaging activity will be permanently deleted from the group messaging conversation and/or device 500 and will no longer be accessible to the user of the electronic device. In some embodiments, the pre-determined amount of time is specific to each individual message (e.g., messaging activity) and the begins the moment that the messaging activity is stored in the deleted messages collection. For instance, the messaging activity that was part of the group messaging conversation when it was moved from the active messages collection to the deleted messages collection (in response to the user deleting and blocking the group messaging conversation) will be permanently deleted from the group messaging activity after being on the deleted messages collection for the pre-determined amount. New messaging activity that is received at the group messaging conversation after it was moved to the deleted messages conversation will be deleted after it has been on the deleted messages collection for the pre-determined amount of time (as measured from the time that the new messaging active is first stored in the deleted messages collection). As an example, the pre-determined time can be in the range of one hour to 100 days.

Figure 8E:
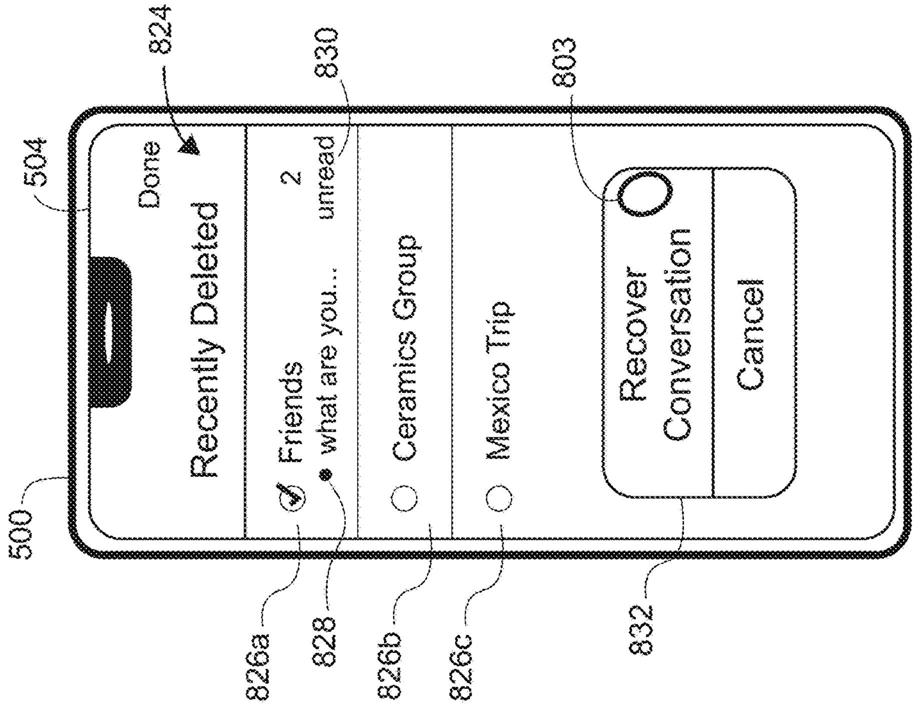

In some embodiments, selectable entries 826A-C are selectable. In FIG. 8D, device 500 detects selection of selectable entry 826A (e.g., via a tap of contact 803 at selectable entry 826A). In response to detecting the selection of selectable entry 826A, device 500 displays a group messaging recovery portion 832 on the deleted messages collection user interface 824 of the messaging application as shown in FIG. 8E. In some embodiments, the user of the electronic device is able to recover a group messaging conversation. "Recovering" a group messaging conversation includes removing the group messaging conversation from the deleted messages collection and moving the group messaging conversation to the active messages collection. In some embodiments, the group messaging recovery portion 832 of user interface 824 includes various selectable entries as illustrated in FIG. 8D.

Figure 8F:
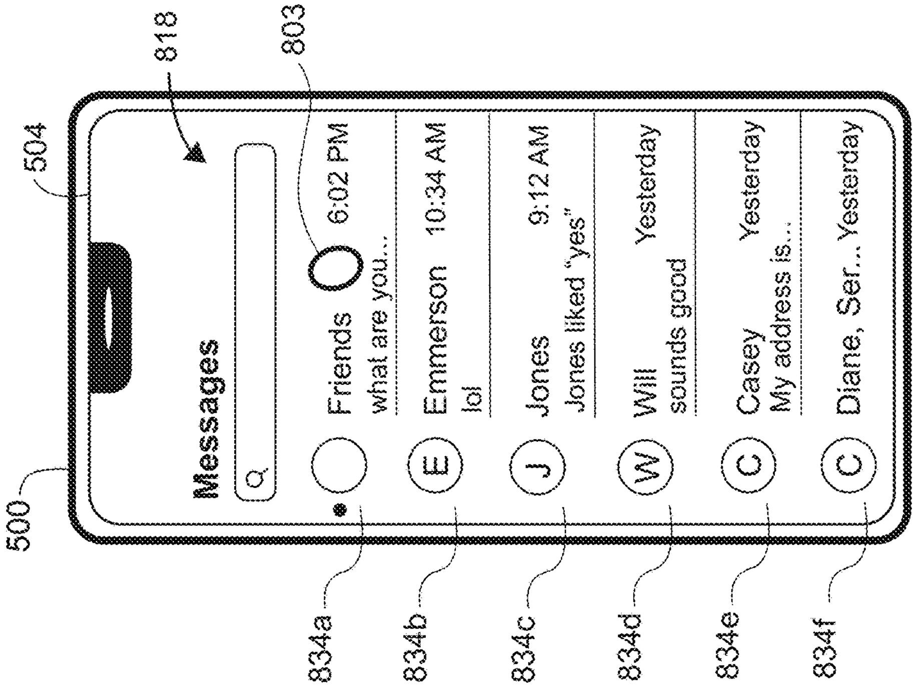
Figure 8G:
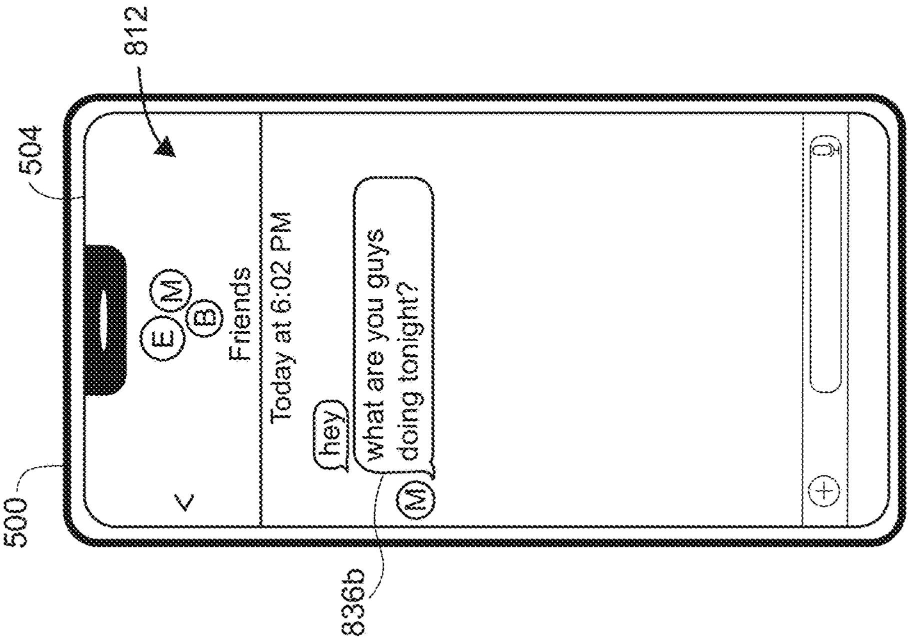
Figure 8H:
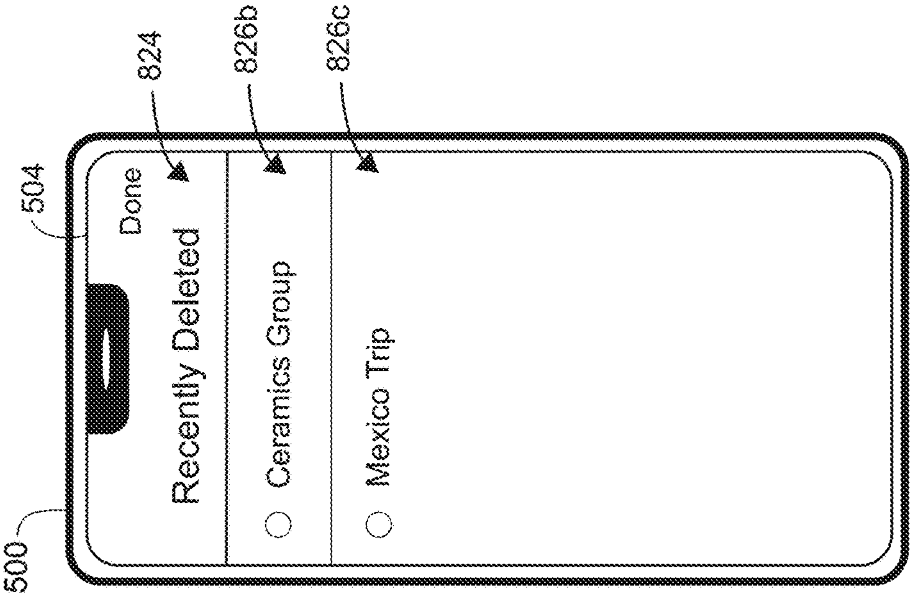

In some embodiments, group messaging recovery portion 832 when selected, initiates a process to move the group messaging conversation from the deleted messages collection to the active messages collection. If the device detects that the user has selected to cancel, then group messaging recovery portion 832 is no longer displayed by the device, and the recovery process is not initiated. In FIG. 8E, device 500 detects selection of recovery portion 832 (e.g., via a tap of contact 803). In response to detecting the selection of recovery portion 832, device 500 displays active messages collection 824 as shown in FIG. 8F. Optionally, the user navigates to the active messages collection 824 with other inputs after recovery portion 832 was selected. As illustrated at FIG. 8F, the Friends group messaging conversation reappears on the active messages collection interface 818 at entry 834A. In some embodiments, the Friends group messaging conversation retains its name and photo. Similar to the example of FIG. 8C, the active messages collection interface 818 includes entries 834B-F corresponding to other messaging conversations that are stored on the active messages collection. In response to detection the selection of recovery portion 832 at FIG. 8E, device 500 removes the Friends group messaging conversation from the deleted messages collection as illustrated at FIG. 8H.

In some embodiments, entries 834A-F are selectable by the user of the electronic device. In FIG. 8F, device 500 detects selection of entry 834A corresponding to the Friends group messaging conversation (e.g., via a tap of contact 803). In response to detecting the selection of entry 834A, device 500 displays group messaging user interface 812 as shown in FIG. 8G. Similar to the example of FIG. 8A, group messaging user interface 812 of FIG. 8G includes messaging activity associated with the group messaging conversation. As shown in FIG. 8G, one or more messages (e.g., the messages that were part of the Friends group messaging conversation prior to the group messaging conversation being deleted and blocked by the user) are no longer part of the group messaging conversation due to those messages exceeding the pre-determined amount of time that they were stored on the deleted messages collection before being permanently deleted (as discussed above). For instance, as illustrated in FIG. 8A, the Friends group messaging conversation included messaging activity that was received at the group messaging conversation on Thursday, March 12th, and Wednesday May 3rd while the group messaging conversation was part of the active messages collection (prior to being deleted and blocked). However, upon being recovered, and as illustrated at FIG. 8G, the group messaging conversation only includes messaging activity that was received "Today," since those messages were not stored on the deleted messages collection longer than the pre-determined time, and since "Today" is more than the pre-determined time after May 3rd.

Figure 8I:
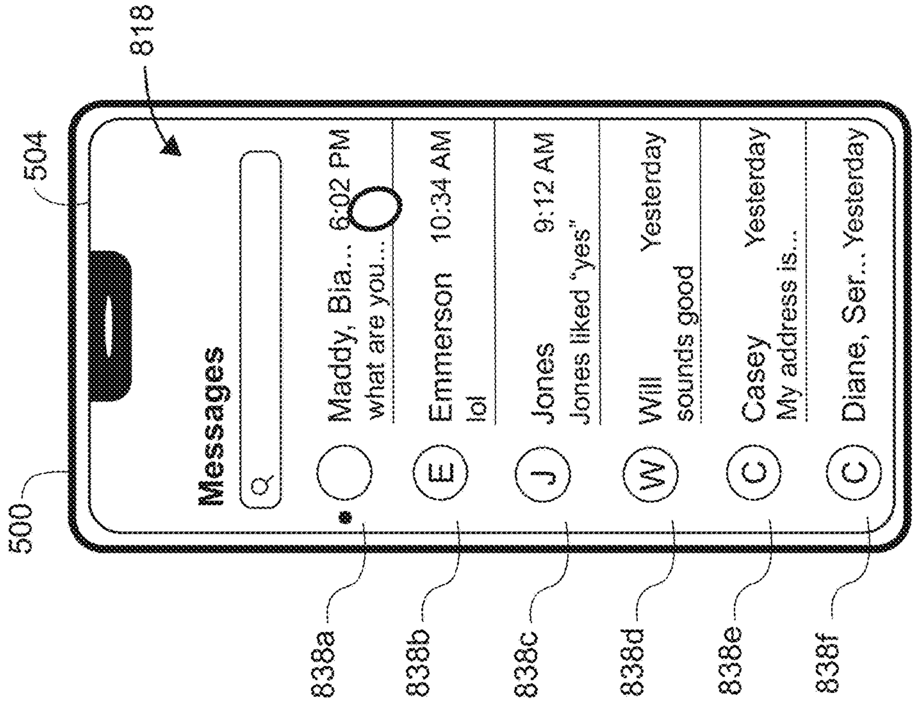
Figure 8J:
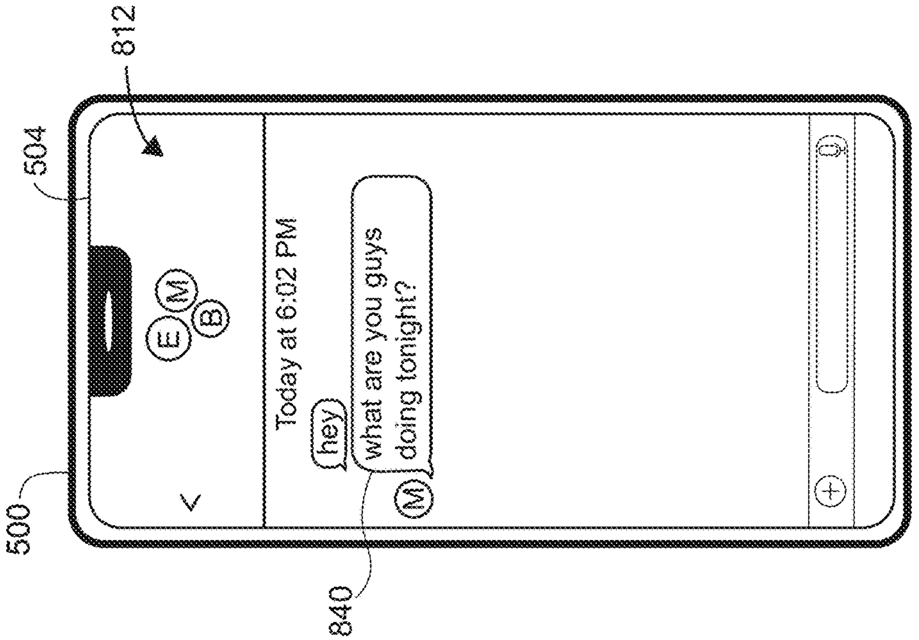

In some embodiments, if all of the messaging activity associated with a group messaging conversation have been permanently deleted while the group messaging conversation is stored on the deleted messages collection (due to exceeding the allotted pre-determined amount of time), any new messaging activity directed to the deleted group messaging conversation is automatically stored and/or displayed in the active messages collection as illustrated at FIG. 8I. Optionally, when the new messaging activity directed to the deleted group messaging conversation is automatically stored on the active messages collection, the messaging activity is stored as a new group messaging activity, and thus does not have customized identifying information associated with it such as a group name and/or photo. Instead, the group messaging conversation includes default identifying information including but not limiting the names of the participants and a default avatar. In some embodiments, the user interface 818 includes one or more selectable entries 838A-F, similar to the example of FIG. 8C. In FIG. 8I, device 500 detection selection of entry 838A corresponding to the newly created group messaging conversation (e.g., via a tap of contact 803). In response to detecting the selection of entry 838A, device 500 displays group messaging user interface 812 as shown in FIG. 8J. In some embodiments, user interface 812 includes messaging activity 840 associated with the newly created group messaging conversation (e.g., newly created in response to the messaging activity received in that group messaging conversation after the Friends group messaging conversation was automatically deleded from the deleted messages collection by device 500). As illustrated in FIG. 8J, the messages that were part of the group messaging activity prior to the group messaging conversation being deleted and blocked at FIG. 8B are not part of the newly created group messaging conversation (due to having been permanently deleted while on the deleted messages collection). The messaging activity 840 of user interface 812 are associated with the newly created group messaging conversation since they were received after the Friends group messaging conversation was permanently deleted from the deleted messages conversation (due to all the messages in the group messaging conversation exceeding their pre-determined time allotment on the deleted messages collection).

Figure 9B:
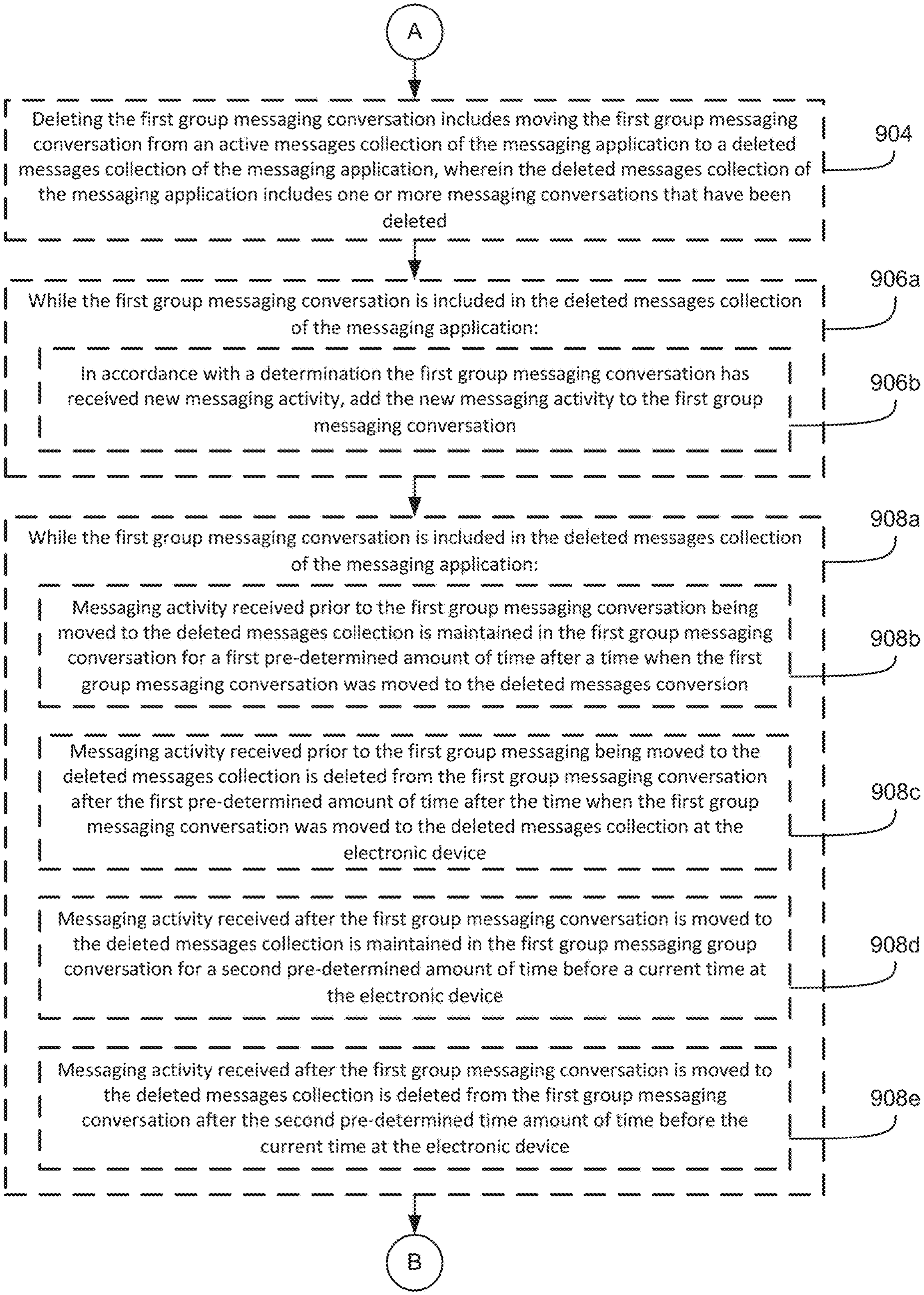
Figure 9C:
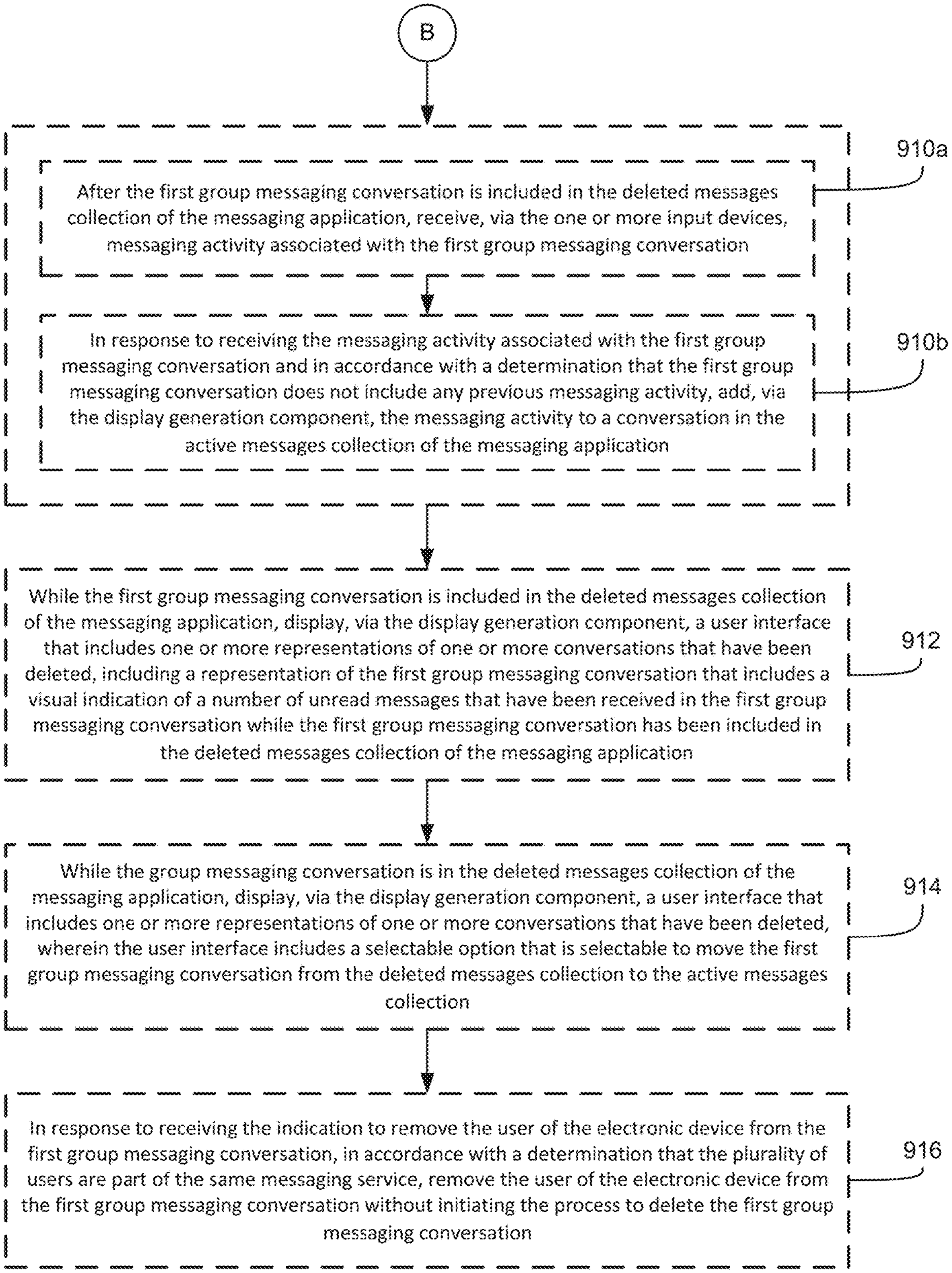

FIGS. 9A-9C is a flow diagram illustrating a method in which an electronic device deletes a hybrid group messaging conversation in accordance with some embodiments of the disclosure. The method 900 is optionally performed at first and/or electronic devices such as device 100, device 300, or device 500 as described above with reference to FIGS. 1A-1B, 2-3, 4A-4B and 5A-5C. Some operations in method 900 are, optionally combined and/or order of some operations is, optionally, changed.

As described below, the method 900 provides ways in which an electronic device deletes a hybrid group messaging conversation. Automatically deleting a messaging conversation when a mixed-service group conversation is implicated allows users that use different messaging services to remove themselves from undesired group messaging activity, including the ability to modify membership in such group messaging activity such that the user no longer receives automatic notifications regarding messaging activity in the mixed-service group conversations, thereby reducing resource consumption by the electronic device and reducing the manual user input needed to manually delete the messaging conversation.

In some embodiments, method 900 is performed at an electronic device in communication with a display generation component and one or more input devices. In some embodiments, the electronic device, the display generation component and/or the one or more input devices have one or more of the characteristics of the electronic device, the display generation component, and/or the one or more input devices of method 700.

In some embodiments, while a user of the electronic device is part of a first group messaging conversation comprising a plurality of users (e.g., such as described with reference to method 700), and while displaying, via the display generation component, a user interface associated with a messaging application via which the first group messaging conversation is conducted (e.g., the user interface and/or the messaging application have one or more of the characteristics of the user interface and/or messaging application described with reference to method 700), the electronic device receives (902*a*), via the one or more input devices, an indication to remove the user of the electronic device from the first group messaging conversation, such as contact 803 in FIG. 8B. In some embodiments, the indication to remove the first user includes detecting selection of a conversation management option displayed in the user interface (e.g., as described with reference to method 700), which causes the electronic device to display one or more selectable options for removing the user from the first group messaging conversation. In some embodiments, while displaying the management user interface that includes one or more selectable options, the electronic device detects selection of the one of the options corresponding to removing the user from the first group messaging conversation. In some embodiments, the indication is a touch input on a touch-sensitive surface, a voice input, or a mouse input.

In some embodiments, in response to receiving the indication to remove the user of the electronic device from the first group messaging conversation (902*b*) and in accordance with a determination that the first group messaging conversation includes one or more users of the plurality of users that are not part of a same messaging service (e.g., such as described with reference to method 700), the electronic device initiates (902*c*) a process to delete the first group messaging conversation in the messaging application, for instance, as illustrated in FIG. 8C. In some embodiments, determining that the first group messaging conversation includes one or more users that are not part of the same messaging service includes determining that a first user of the one or more users utilizes a messaging service that is different from the messaging service used by a second user of the one or more users. Additionally or alternatively, determining that the first group messaging conversation optionally includes one or more users that are not part of the same messaging service includes determining that a first user of the first group messaging conversation does not utilize a messaging service that the other one or more users of the first group messaging conversation utilize. In some embodiments, initiating a process to delete the first group messaging conversation includes deleting the first group messaging conversation from a list of active messaging conversations maintained by the messaging application. Optionally, deleting the first group messaging conversation from a list of active messaging conversations includes not allowing any messaging activity received on the first group messaging conversation to be presented to the user via one or more user interfaces as new messaging activity on an active messaging conversation. In some embodiments, deleting the first group messaging conversation includes moving the first group messaging conversation to a list of inactive messaging conversations. Optionally, moving the first group messaging conversation to a list of inactive messaging conversation includes displaying any messaging activity received on the first group messaging conversation on the list of inactive messaging conversations. In some embodiments, deleting the first group messaging conversation includes preventing automatic notifications from being generated (e.g., displayed and/or presented as audio) on the electronic device of the user when messaging activity is received on the first group messaging conversation. In some embodiments, initiating a process to delete the group messaging conversation in the messaging application includes providing the user with one or more user interfaces that are configured to confirm that the user wants to delete the first group messaging conversation. If the device detects that the user confirms that they want to delete the first group messaging conversation, then the device moves the first group messaging conversation to a list of inactive messages. When deleted, the first group messaging conversation appears inactive to the user who deleted the conversation, but optionally appears active and/or remains accessible to other users who are part of the first group messaging conversation (e.g., those other users are still able to send/receive messages in the first group messaging conversation). Automatically deleting a messaging conversation when a mixed-service group conversation is implicated allows users that use different messaging services to remove themselves from undesired group messaging activity, including the ability to modify membership in such group messaging activity such that the user no longer receives automatic notifications regarding messaging activity in the mixed-service group conversations, thereby reducing resource consumption by the electronic device and reducing the manual user input needed to manually delete the messaging conversation.

In some embodiments, deleting the first group messaging conversation includes moving the first group messaging conversation from an active messages collection of the messaging application to a deleted messages collection of the messaging application, such as in FIG. 8D, wherein the deleted messages collection of the messaging application includes one or more messaging conversations that have been deleted (904). In some embodiments, the active messages collection includes a collection of conversations and messages that the user is currently engaged with and are displayed by the messaging application when the user accesses the messaging application. In some embodiments, the deleted messages collection includes a collection of conversations and messages that the user has selected to no longer be included in the active messages collection. Optionally, the conversations and messages stored on the deleted messages collection are accessible to the user when an indication is received at the device that the user has selected an option on the messaging application to view the deleted messages collection. Automatically moving a messaging conversation to a deleted messages collection when a user indicates that the messaging conversation is to be deleted, allows for the user to still have access to the messaging conversation without the messaging conversation always being displayed to the user when the user accesses the messaging application thus maximizing the amount of display area on the electronic device that can be dedicated to active messages.

In some embodiments, while the first group messaging conversation is included in the deleted messages collection of the messaging application (906*a*), and in accordance with a determination the first group messaging conversation has received new messaging activity, the electronic device adds (906*b*) the new messaging activity to the first group messaging conversation, such as to the Friends group messaging conversation in FIG. 8D. In some embodiments, while the first group messaging conversation is maintained on the deleted messages collection of the messaging application, (some or any or all) new messaging activity added to the first group messaging conversation (e.g., from users other than the user of the electronic device) will become part of the first group messaging conversation and is accessible to the user when they access the first group messaging conversation stored on the deleted messages collection. Optionally, when the user accesses the deleted messages collection on the messaging application, the user interface associated with the deleted messages collection displays, via the display generation component, an indication of the new messaging activity associated with the first group messaging conversation. Optionally, the indication of the new messaging activity includes placing a visual indicator overlaid on or adjacent to the listing of the first group messaging conversation on the deleted messages collection. Optionally, the visual indicator includes placing a visual marker next to the listing of the first group messaging conversation on the deleted messages collection, changing the font of the listing, and/or changing a color associated with listing. Adding new messaging activity generated on a deleted group messaging conversation while it is part of the deleted messages collection, allows for the user to access new messaging activity on the deleted group messaging conversation even though the conversation has been deleted by the user, and thus allows for the user interface on which the group messaging conversation is conducted on to display more messaging activity on a single display.

In some embodiments, while the first group messaging conversation is included in the deleted messages collection of the messaging application (908*a*), messaging activity received prior to the first group messaging conversation being moved to the deleted messages collection is maintained by the electronic device (908*b*) in the first group messaging conversation for a first pre-determined amount of time after a time when the first group messaging conversation was moved to the deleted messages conversion. In some embodiments, messaging activity received prior to the first group messaging being moved to the deleted messages collection is deleted by the electronic device (908*c*) from the first group messaging conversation after the first pre-determined amount of time after the time when the first group messaging conversation was moved to the deleted messages collection at the electronic device, such as the messages of FIG. 8A being deleted from the group messaging conversation in FIG. 8G. In some embodiments, once a user deletes the first group messaging conversation, and the conversation is moved to the deleted messages collection, the messaging activity that was associated with the group messaging conversation prior to deletion will be retained for a pre-determined amount of time from the time the group messaging conversation was moved to the deleted messages collection (e.g., for a first pre-determined amount of time). Optionally, messaging activity that was associated with the group messaging conversation prior to deletion will be deleted after the first pre-determined amount of time has elapsed.

In some embodiments, messaging activity received after the first group messaging conversation is moved by the electronic device to the deleted messages collection is maintained by the electronic device (908*d*) in the first group messaging group conversation for a second pre-determined amount of time (e.g., optionally the same as the first pre-determined amount of time) before a current time at the electronic device.

In some embodiments, messaging activity received after the first group messaging conversation is moved by the electronic device to the deleted messages collection is deleted by the electronic device (908*e*) from the first group messaging conversation after the second pre-determined time amount of time before the current time at the electronic device, for instance if the messages 836*b* in FIG. 8G, had remained on the deleted messages collection longer than the pre-determined amount of time. In some embodiments, messaging activity that was received in the group messaging conversation after the conversation was moved to the deleted messages conversation will be retained for a pre-determined amount of time (e.g., the second pre-determined amount of time) and will be deleted after the second pre-determined amount of time has expired. Automatically deleting messages older than a pre-determined time threshold on a group conversation that has been moved to the deleted messages collection allows the user to still have access to recent messaging activity on the group messaging conversation, while preserving memory on the device by deleting older messaging activity.

In some embodiments, after the first group messaging conversation is included in the deleted messages collection of the messaging application, the electronic device receives (910*a*), via the one or more input devices, messaging activity associated with the first group messaging conversation, such as shown in entry 826*a* of FIG. 8D.

In some embodiments, in response to receiving the messaging activity associated with the first group messaging conversation and in accordance with a determination that the first group messaging conversation does not include any previous messaging activity, the electronic device adds (910*b*), via the display generation component, the messaging activity to a conversation in the active messages collection of the messaging application, such as entry 838*a* in FIG. 8I. In some embodiments, once the first group messaging conversation has been placed in the deleted messages collection and no new messaging activity has been received on the first group messaging conversation within a pre-determined time, such as described above, eventually all the messaging activity stored on the first group messaging conversation will be removed/deleted from the first group messaging conversation and/or the messaging application. Optionally, once the first group messaging conversation stored on the deleted messages collection no longer includes any messaging activity (because the messaging activity was deleted), the first group messaging conversation is removed from the deleted messages collection such that it no longer appears on the deleted messages collection, and thus will no longer be accessible and/or displayed by the device via the messaging application. In some embodiments, once the first group messaging conversation has been removed from the deleted messages collection due to no longer containing any messaging activity, some or all or any new messaging activity directed to the first group messaging conversation will automatically appear in the active message collection as part of a new group messaging conversation (e.g., different from the first group messaging conversation, but including, as participants, one or more or all of the prior participants of the first group messaging conversation). Automatically adding new messaging activity directed to a deleted group messaging conversation that has been removed from the deleted messages collection due to no longer containing any messaging activity ensures that the user of the electronic device receives and has access to new messaging activity even when a group messaging conversation has been deleted from the messaging application without requiring the device to permanently store deleted messages thereby conserving memory resources of the device.

In some embodiments, while the first group messaging conversation is included in the deleted messages collection of the messaging application, the electronic device displays (912), via the display generation component, a user interface that includes one or more representations of one or more conversations that have been deleted, including a representation of the first group messaging conversation that includes a visual indication of a number of unread messages that have been received in the first group messaging conversation while the first group messaging conversation has been included in the deleted messages collection of the messaging application, such as numerical indicator 830 in FIG. 8D. In some embodiments, the user interface that displays the conversations in the deleted messages collection includes a visual indication of the number of unread messages (e.g., separate messaging activity instances) that have been received in the first group messaging conversation since the first group messaging conversation has been moved to the deleted messages collection. Optionally, the visual indicator includes a number indicating the number of unread messages that is displayed with the entry on the deleted messages collection associated with the first group messaging conversation. Optionally, the indicator includes a least a portion of the messaging activity that is displayed on the user interface. Displaying an indicator of unread messages associated with a group messaging conversation while the conversation has been on the deleted messages collection allows the user to efficiently determine how many messages have received at the group messaging conversation since the last time the user accessed the deleted messages collection, thereby minimizing the possibility that the user misses messaging activity that is being stored on the deleted messages collection, and minimizing the number of user inputs on the device needed to determine if new messaging activity has taken place in a deleted group messaging conversation.

In some embodiments, while the group messaging conversation is in the deleted messages collection of the messaging application, the electronic device displays (914), via the display generation component, a user interface that includes one or more representations of one or more conversations that have been deleted, wherein the user interface includes a selectable option that is selectable to move the first group messaging conversation from the deleted messages collection to the active messages collection. In some embodiments, a user interface that displays conversations and messages included in the deleted messages conversation, includes a selectable option that allows the user to move the first group messaging conversation back to the active messages collection. Optionally, the user interface with the selectable option is part of the user interface that displays the messaging activity associated with the first group messaging conversation. In some embodiments, in response to the device receiving an indication to recover the first group messaging conversation (e.g., move the first group messaging conversation from the deleted messages collection to the active messages collection), such as selection of the selectable option, the first group messaging conversation is displayed on a user interface that includes one or more representations of one or more conversation that are active (e.g., are not deleted). Optionally, the first group messaging conversation, when recovered and placed on the active messages collection, appears at a position on the list of active messages that is based on the time when the last messaging activity of the first group messaging conversation was received, even when that messaging activity was received while the first group messaging conversation was on the deleted list. Optionally, the electronic device displays the first group messaging conversation, when recovered and placed on the active messages collection, at the top of a list of conversations and messages that are on the active message collection. Providing the user with the option to recover group messaging conversations that were previously selected to be deleted, and automatically replacing the recovered group messaging conversations onto the active messages collection, ensures that a decision to delete a group messaging conversation is not permanent and is reversible at the user's discretion, thereby allowing the device to reversibly suppress deleted messages from being actively displayed on the device.

In some embodiments, in response to receiving the indication to remove the user of the electronic device from the first group messaging conversation, and in accordance with a determination that the plurality of users are part of the same messaging service (e.g., such as described with reference to method 700) (and optionally in accordance with a determination that the messaging service being utilized by the users of the first group messaging conversation allows for changes to the group conversation membership), the electronic device removes (916) the user of the electronic device from the first group messaging conversation without initiating the process to delete the first group messaging conversation (and maintaining the first group messaging conversation). In some embodiments, determining that the plurality of users of the first group messaging conversation are part of the same messaging service includes determining that each user of the first group messaging conversation utilizes the same messaging service (e.g., optionally the first messaging service described with reference to method 700) while part of the first group messaging conversation. In some embodiments, the messaging service utilized by the plurality of users includes the ability for users to remove themselves from group messaging conversations (whereas in contrast, other messaging services may not have this capability). In accordance with the determination that the plurality of users that are part of the first group messaging conversation use the same messaging service to conduct the first group messaging conversation, the user is removed from the first group messaging conversation without moving the first group messaging conversation to the deleted messages collection. Allowing a user to remove themselves from a group messaging conversation without moving the group messaging conversation to a deleted messages collection preserves memory and other computing resources of the electronic device.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9C. For example, the operation of the electronic device to present a communication feature described above with reference to method 900 optionally has one or more of the characteristics of the adding a user to a hybrid group messaging conversation described herein with reference to other methods described herein (e.g., method 700). Additionally, deleting a hybrid group messaging described with reference to method 900 has one or more characteristics of adding a user to a hybrid group messaging conversation described with reference to method 700. For brevity, these details are not repeated here.

The operations in the information processing methods described above are, optionally, implemented by running one or more functional modules in an information processing apparatus such as general-purpose processors (e.g., a as described with respect to FIGS. 1A-1B, 3, 5A-5J) or application specific chips. Further, the operations described above with reference to FIGS. 9A-9C are, optionally, implemented by components depicted in FIGS. 1A-1B. For example, displaying operation 902*a*, receiving operation 902*a*, and initiate operation 902*c* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is capturing and displaying content and location information. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, capturing and transmitting content can enable the user to view the content at a later time. Accordingly, use of such personal information data enables users to use electronic devices to view content. Further, other uses for personal information data that benefit the user are also contemplated by the present disclosure. For instance, location data may be used to enhance communications between devices.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location services, the present technology can be configured to allow users to select to “opt in” or “opt out” of participation in the collection of personal information data during registration for services or anytime thereafter. In another example, users can select not to enable location services in a specific application (e.g., first application and/or second application). In addition to providing “opt in” and “opt out” options, the present disclosure contemplates providing notifications relating to the access or use of personal information. For instance, a user may be notified upon initiating content collection that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an electronic device transmits communications without associating the content with location data.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at an electronic device in communication with a display generation component and one or more input devices:

while a user of the electronic device is part of a first group messaging conversation comprising a plurality of users, wherein the first group messaging conversation includes at least a respective user of the plurality of users that is not part of a same messaging service, and while displaying, via the display generation component, a user interface associated with a messaging application via which the first group messaging conversation is conducted, receiving, via the one or more input devices, an indication to remove the user of the electronic device from the first group messaging conversation; and in response to receiving the indication to remove the user of the electronic device from the first group messaging conversation:

initiating a process to delete the first group messaging conversation in the messaging application.

2. The method of claim 1, wherein deleting the first group messaging conversation includes moving the first group messaging conversation from an active messages collection of the messaging application to a deleted messages collection of the messaging application, wherein the deleted messages collection of the messaging application includes one or more messaging conversations that have been deleted.

3. The method of claim 2, wherein the method further comprises: while the first group messaging conversation is included in the deleted messages collection of the messaging application: in accordance with a determination the first group messaging conversation has received new messaging activity, adding the new messaging activity to the first group messaging conversation.

4. The method of claim 2, wherein while the first group messaging conversation is included in the deleted messages collection of the messaging application:

messaging activity received prior to the first group messaging conversation being moved to the deleted messages collection is maintained in the first group messaging conversation for a first pre-determined amount of time after a time when the first group messaging conversation was moved to the deleted messages conversion; messaging activity received prior to the first group messaging being moved to the deleted messages collection is deleted from the first group messaging conversation after the first pre-determined amount of time after the time when the first group messaging conversation was moved to the deleted messages collection at the electronic device; messaging activity received after the first group messaging conversation is moved to the deleted messages collection is maintained in the first group messaging group conversation for a second pre-determined amount of time before a current time at the electronic device; and messaging activity received after the first group messaging conversation is moved to the deleted messages collection is deleted from the first group messaging conversation after the second pre-determined time amount of time before the current time at the electronic device.

5. The method of claim 2, wherein the method further comprises: after the first group messaging conversation is included in the deleted messages collection of the messaging application, receiving, via the one or more input devices, messaging activity associated with the first group messaging conversation; and in response to receiving the messaging activity associated with the first group messaging conversation and in accordance with a determination that the first group messaging conversation does not include any previous messaging activity, adding, via the display generation component, the messaging activity to a conversation in the active messages collection of the messaging application.

6. The method of claim 2, wherein the method further comprises while the first group messaging conversation is included in the deleted messages collection of the messaging application, displaying, via the display generation component, a second user interface that includes one or more representations of one or more conversations that have been deleted, including a representation of the first group messaging conversation that includes a visual indication of a number of unread messages that have been received in the first group messaging conversation while the first group messaging conversation has been included in the deleted messages collection of the messaging application.

7. The method of claim 2, further comprising while the group messaging conversation is in the deleted messages collection of the messaging application, displaying, via the display generation component, a second user interface that includes one or more representations of one or more conversations that have been deleted, wherein the second user interface includes a selectable option that is selectable to move the first group messaging conversation from the deleted messages collection to the active messages collection.

8. The method of claim 1, further comprising:

while a user of the electronic device is part of a second group messaging conversation comprising an additional plurality of users, the additional plurality of users that are part of a same messaging service, and while displaying, via the display generation component, a user interface associated with a messaging application via which the second group messaging conversation is conducted, receiving, via the one or more input devices, an indication to remove the user of the electronic device from the second group messaging conversation; and in response to receiving the indication to remove the user of the electronic device from the second group messaging conversation, removing the user of the electronic device from the first second group messaging conversation without initiating a process to delete the second group messaging conversation.

9. An electronic device that is in communication with a display generation component and one or more input devices, the electronic device comprising: one or more processors; memory; and one or more programs, wherein the one or more programs are stored in the memory and configured to be executed by the one or more processors, the one or more programs including instructions for: while a user of the electronic device is part of a first group messaging conversation comprising a plurality of users, and while displaying, via the display generation component, a user interface associated with a messaging application via which the first group messaging conversation is conducted, receiving, via the one or more input devices, an indication to remove the user of the electronic device from the first group messaging conversation; and in response to receiving the indication to remove the user of the electronic device from the first group messaging conversation: in accordance with a determination that the first group messaging conversation includes one or more users of the plurality of users that are not part of a same messaging service, initiating a process to delete the first group messaging conversation in the messaging application.

10. The electronic device of claim 9, wherein deleting the first group messaging conversation includes moving the first group messaging conversation from an active messages collection of the messaging application to a deleted messages collection of the messaging application, wherein the deleted messages collection of the messaging application includes one or more messaging conversations that have been deleted.

11. The electronic device of claim 10, wherein the one or more programs further include instructions for:

while the first group messaging conversation is included in the deleted messages collection of the messaging application:

in accordance with a determination the first group messaging conversation has received new messaging activity, adding the new messaging activity to the first group messaging conversation.

12. The electronic device of claim 11, wherein while the first group messaging conversation is included in the deleted messages collection of the messaging application:

messaging activity received prior to the first group messaging conversation being moved to the deleted messages collection is maintained in the first group messaging conversation for a first pre-determined amount of time after a time when the first group messaging conversation was moved to the deleted messages collection;

messaging activity received prior to the first group messaging being moved to the deleted messages collection is deleted from the first group messaging conversation after the first pre-determined amount of time after the time when the first group messaging conversation was moved to the deleted messages collection at the electronic device;

messaging activity received after the first group messaging conversation is moved to the deleted messages collection is maintained in the first group messaging group conversation for a second pre-determined amount of time before a current time at the electronic device; and messaging activity received after the first group messaging conversation is moved to the deleted messages collection is deleted from the first group messaging conversation after the second pre-determined amount of time before the current time at the electronic device.

13. The electronic device of claim 11, wherein the one or more programs further include instructions for:

after the first group messaging conversation is included in the deleted messages collection of the messaging application, receiving, via the one or more input devices, messaging activity associated with the first group messaging conversation; and in response to receiving the messaging activity associated with the first group messaging conversation and in accordance with a determination that the first group messaging conversation does not include any previous messaging activity, adding, via the display generation component, the messaging activity to a conversation in the active messages collection of the messaging application.

14. The electronic device of claim 11, wherein the one or more programs further include instructions for while the first group messaging conversation is included in the deleted messages collection of the messaging application, displaying, via the display generation component, a second user interface that includes one or more representations of one or more conversations that have been deleted, including a representation of the first group messaging conversation that includes a visual indication of a number of unread messages that have been received in the first group messaging conversation while the first group messaging conversation has been included in the deleted messages collection of the messaging application.

15. The electronic device of claim 11, wherein the one or more programs further include instructions for, while the first group messaging conversation is in the deleted messages collection of the messaging application, displaying, via the display generation component, a second user interface that includes one or more representations of one or more conversations that have been deleted, wherein the second user interface includes a selectable option that is selectable to move the first group messaging conversation from the deleted messages collection to the active messages collection.

16. The electronic device of claim 10, wherein the one or more programs further include instructions for:

while a user of the electronic device is part of a second group messaging conversation comprising an additional plurality of users, the additional plurality of users that are part of a same messaging service, and while displaying, via the display generation component, a user interface associated with a messaging application via which the second group messaging conversation is conducted, receiving, via the one or more input devices, an indication to remove the user of the electronic device from the second group messaging conversation; and in response to receiving the indication to remove the user of the electronic device from the second group messaging conversation, removing the user of the electronic device from the second group messaging conversation without initiating a process to delete the second group messaging conversation.

17. A non-transitory computer readable storage medium storing one or more programs, the one or more programs comprising instructions, which when executed by one or more processors of an electronic device, cause the electronic device to perform a method comprising: while a user of the electronic device is part of a first group messaging conversation comprising a plurality of users, and while displaying, via a display generation component, a user interface associated with a messaging application via which the first group messaging conversation is conducted, receiving, via one or more input devices of the electronic device, an indication to remove the user of the electronic device from the first group messaging conversation; and in response to receiving the indication to remove the user of the electronic device from the first group messaging conversation: in accordance with a determination that the first group messaging conversation includes one or more users of the plurality of users that are not part of a same messaging service, initiating a process to delete the first group messaging conversation in the messaging application.

18. The non-transitory computer readable storage medium of claim 17, wherein deleting the first group messaging conversation includes moving the first group messaging conversation from an active messages collection of the messaging application to a deleted messages collection of the messaging application, wherein the deleted messages collection of the messaging application includes one or more messaging conversations that have been deleted.

19. The non-transitory computer readable storage medium of claim 18, the one or more programs comprising further instructions, which when executed by one or more processors of an electronic device, cause the electronic device to perform a method comprising:

while the first group messaging conversation is included in the deleted messages collection of the messaging application:

in accordance with a determination the first group messaging conversation has received new messaging activity, adding the new messaging activity to the first group messaging conversation.

20. The non-transitory computer readable storage medium of claim 18, wherein while the first group messaging conversation is included in the deleted messages collection of the messaging application:

messaging activity received prior to the first group messaging conversation being moved to the deleted messages collection is maintained in the first group messaging conversation for a first pre-determined amount of time after a time when the first group messaging conversation was moved to the deleted messages collection;

messaging activity received prior to the first group messaging being moved to the deleted messages collection is deleted from the first group messaging conversation after the first pre-determined amount of time after the time when the first group messaging conversation was moved to the deleted messages collection at the electronic device;

messaging activity received after the first group messaging conversation is moved to the deleted messages collection is maintained in the first group messaging group conversation for a second pre-determined amount of time before a current time at the electronic device; and messaging activity received after the first group messaging conversation is moved to the deleted messages collection is deleted from the first group messaging conversation after the second pre-determined amount of time before the current time at the electronic device.

21. The non-transitory computer readable storage medium of claim 18, wherein the one or more programs further include instructions for: the one or more programs comprising further instructions, which when executed by one or more processors of an electronic device, cause the electronic device to perform a method comprising:

after the first group messaging conversation is included in the deleted messages collection of the messaging application, receiving, via the one or more input devices, messaging activity associated with the first group messaging conversation; and in response to receiving the messaging activity associated with the first group messaging conversation and in accordance with a determination that the first group messaging conversation does not include any previous messaging activity, adding, via the display generation component, the messaging activity to a conversation in the active messages collection of the messaging application.

22. The non-transitory computer readable storage medium of claim 18, wherein the one or more programs comprising further instructions, which when executed by one or more processors of an electronic device, cause the electronic device to perform a method comprising, while the first group messaging conversation is included in the deleted messages collection of the messaging application, displaying, via the display generation component, a second user interface that includes one or more representations of one or more conversations that have been deleted, including a representation of the first group messaging conversation that includes a visual indication of a number of unread messages that have been received in the first group messaging conversation while the first group messaging conversation has been included in the deleted messages collection of the messaging application.

23. The non-transitory computer readable storage medium of claim 18, the one or more programs comprising further instructions, which when executed by one or more processors of an electronic device, cause the electronic device to perform a method comprising, while the first group messaging conversation is in the deleted messages collection of the messaging application, displaying, via the display generation component, a second user interface that includes one or more representations of one or more conversations that have been deleted, wherein the second user interface includes a selectable option that is selectable to move the first group messaging conversation from the deleted messages collection to the active messages collection.

24. The non-transitory computer readable storage medium of claim 17, wherein the one or more programs further include instructions for:

while a user of the electronic device is part of a second group messaging conversation comprising an additional plurality of users, the additional plurality of users that are part of a same messaging service, and while displaying, via the display generation component, a user interface associated with a messaging application via which the second group messaging conversation is conducted, receiving, via the one or more input devices, an indication to remove the user of the electronic device from the second group messaging conversation; and in response to receiving the indication to remove the user of the electronic device from the second group messaging conversation, removing the user of the electronic device from the second group messaging conversation without initiating a process to delete the second group messaging conversation.

* * * * *